United States Patent

Kumai et al.

[11] Patent Number: 5,537,271
[45] Date of Patent: Jul. 16, 1996

[54] APPARATUS FOR LOADING A DATA RECORDING DISK

[75] Inventors: Katsunori Kumai, Tokyo; Toshikazu Hayashi, Sagamihara; Hiroshi Kodama; Yoshihisa Ishikawa, both of Tokyo, all of Japan

[73] Assignee: Olympus Optical Co., Ltd., Japan

[21] Appl. No.: 171,526

[22] Filed: Dec. 22, 1993

[30] Foreign Application Priority Data

Dec. 28, 1992 [JP] Japan ................... 4-360068
Dec. 28, 1992 [JP] Japan ................... 4-360069
Jan. 18, 1993 [JP] Japan ................... 5-006147

[51] Int. Cl.⁶ .................... G11B 17/04; G11B 33/02
[52] U.S. Cl. ........................ 360/99.06; 369/77.2
[58] Field of Search ............ 360/99.06, 99.07, 360/99.02, 99.03, 98.07; 369/77.1, 77.2, 75.1, 75.2

[56] References Cited

U.S. PATENT DOCUMENTS

| | | | |
|---|---|---|---|
| 5,224,079 | 6/1993 | Inoue | 369/77.2 |
| 5,260,922 | 11/1993 | Chigasaki | 360/99.06 |
| 5,260,924 | 11/1993 | Hayashi | 369/71 |
| 5,343,457 | 8/1994 | Hoshi | 360/99.06 |

FOREIGN PATENT DOCUMENTS

| | | |
|---|---|---|
| 467461 | 3/1992 | Japan . |
| 4109487 | 4/1992 | Japan . |
| 4137256 | 5/1992 | Japan . |
| 4168673 | 6/1992 | Japan . |
| 4186554 | 7/1992 | Japan . |

*Primary Examiner*—Stuart S. Levy
*Assistant Examiner*—Allen Cao
*Attorney, Agent, or Firm*—Laff, Whitesel, Conte & Saret, Ltd.

[57] ABSTRACT

An apparatus comprises first and second levers supported to be rotatable on a holder which holds a disc cartridge. The first lever has one end provided with a abutting pin which abuts the shutter to open the window of the cartridge, and other end connected to a shutter-closing spring to rotate the first lever to close the window and eject the cartridge from the holder. The second lever has one end coupled to the shutter-closing spring and other end provided with a push pin and connected to a break spring to make the push pin apply a force to the side of the cartridge. When the cartridge is inserted into the holder, the shutter-closing spring decreases the bias of the brake spring whereby decreasing the force with which the push pin pushes the side of the cartridge.

6 Claims, 21 Drawing Sheets

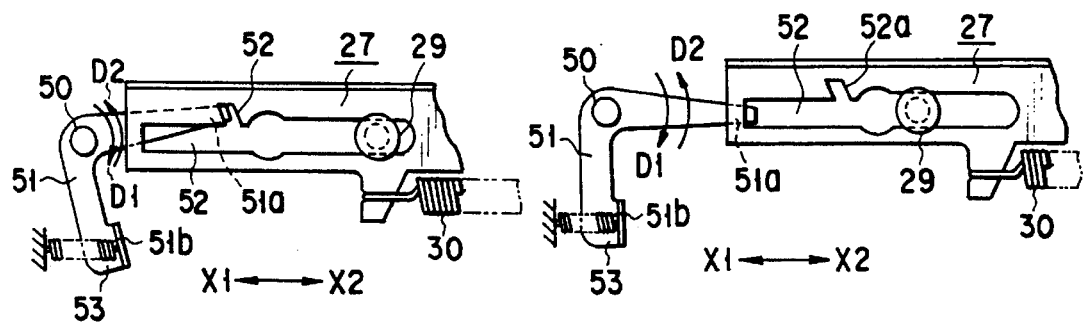
FIG. 7
FIG. 8
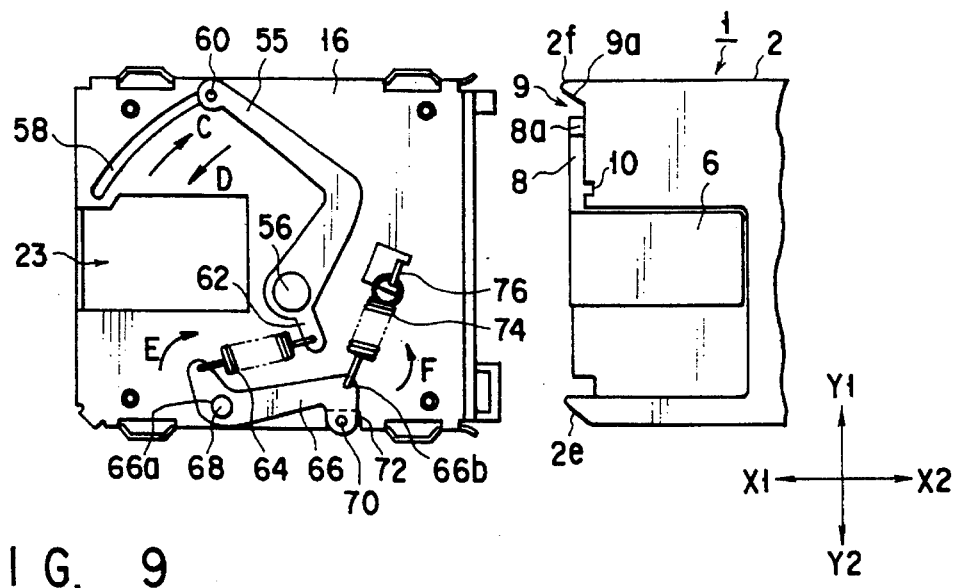
FIG. 9
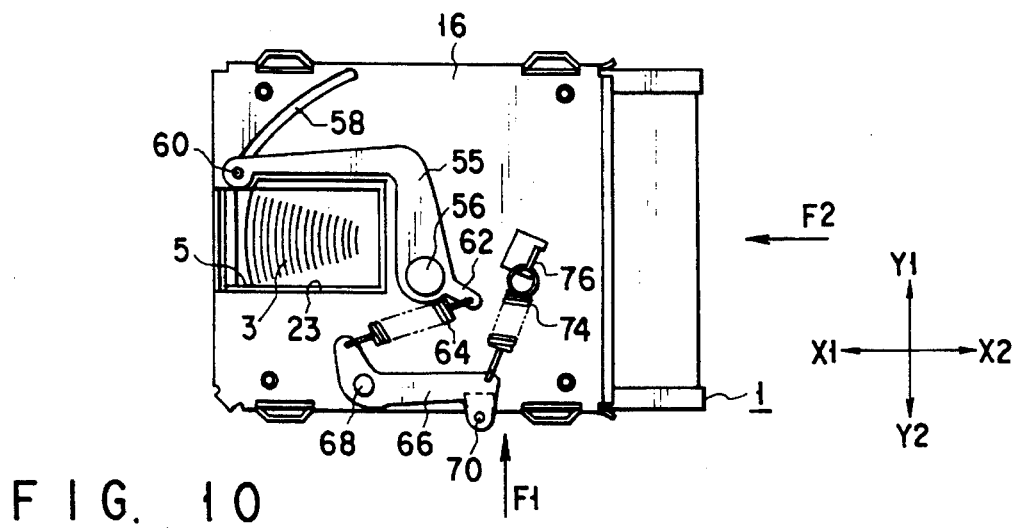
FIG. 10

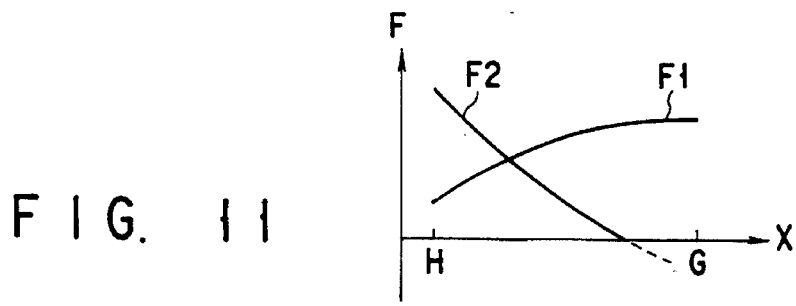
FIG. 11
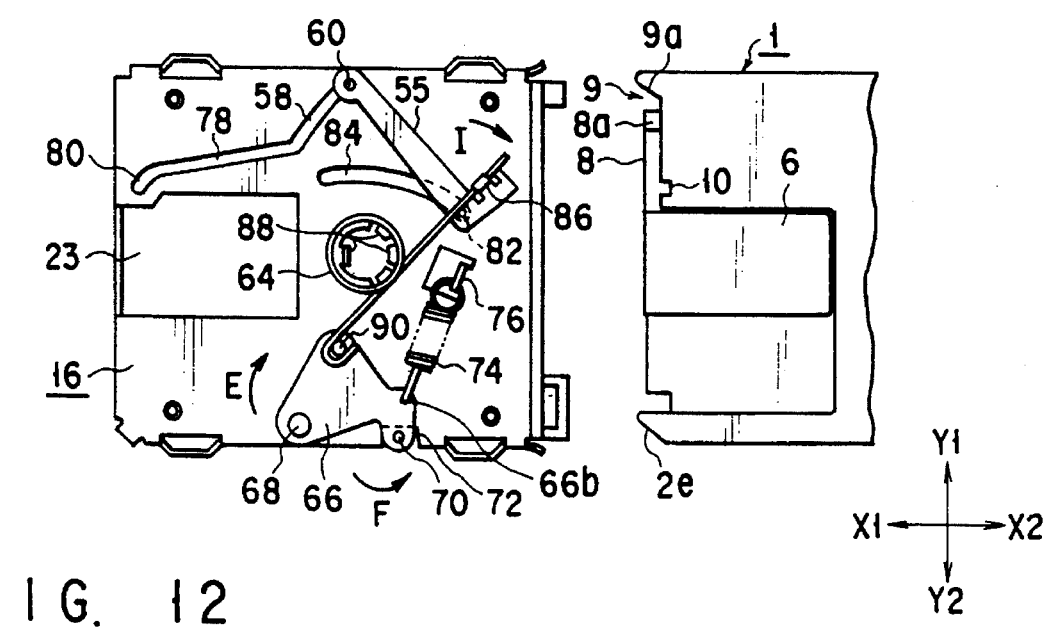
FIG. 12
FIG. 13

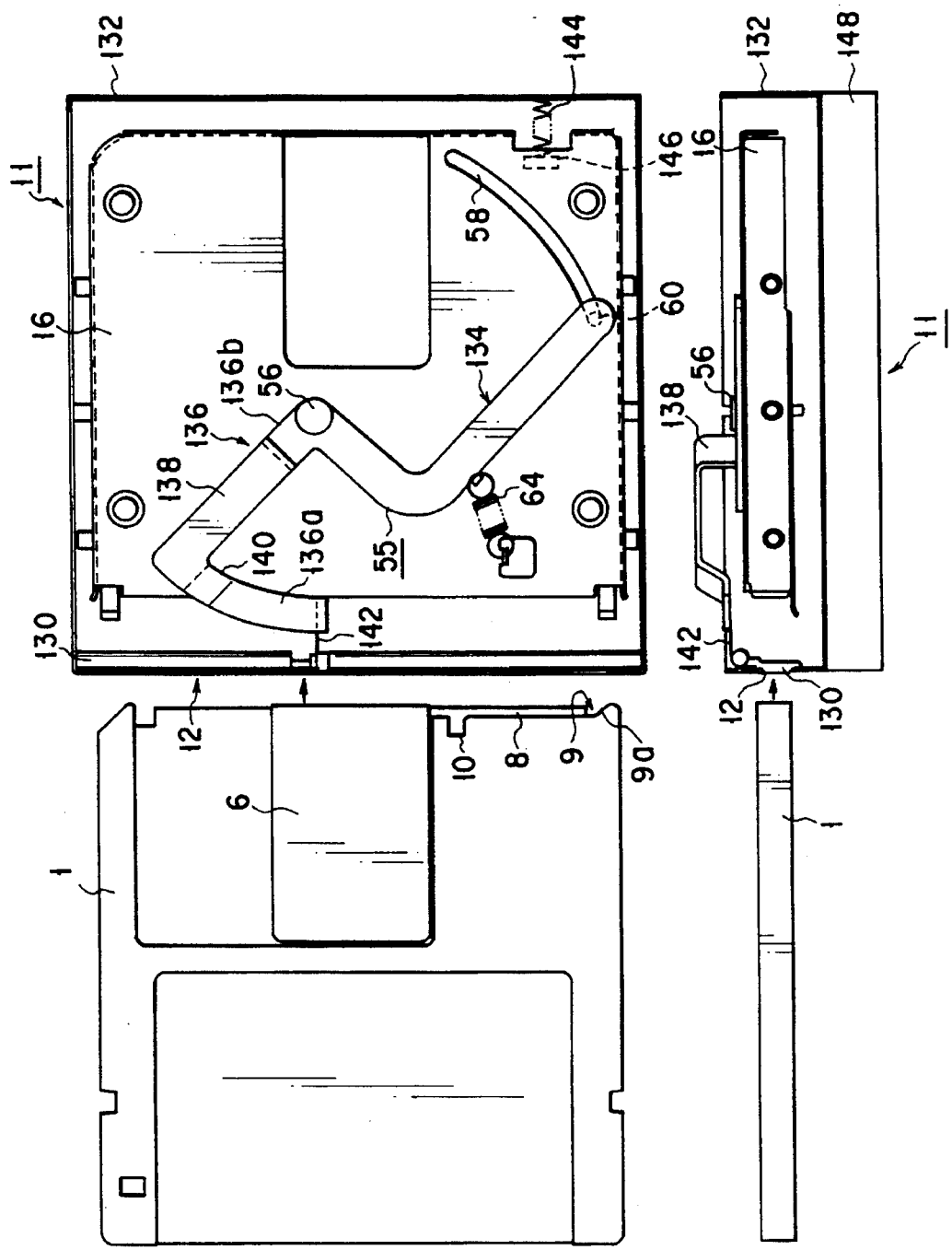

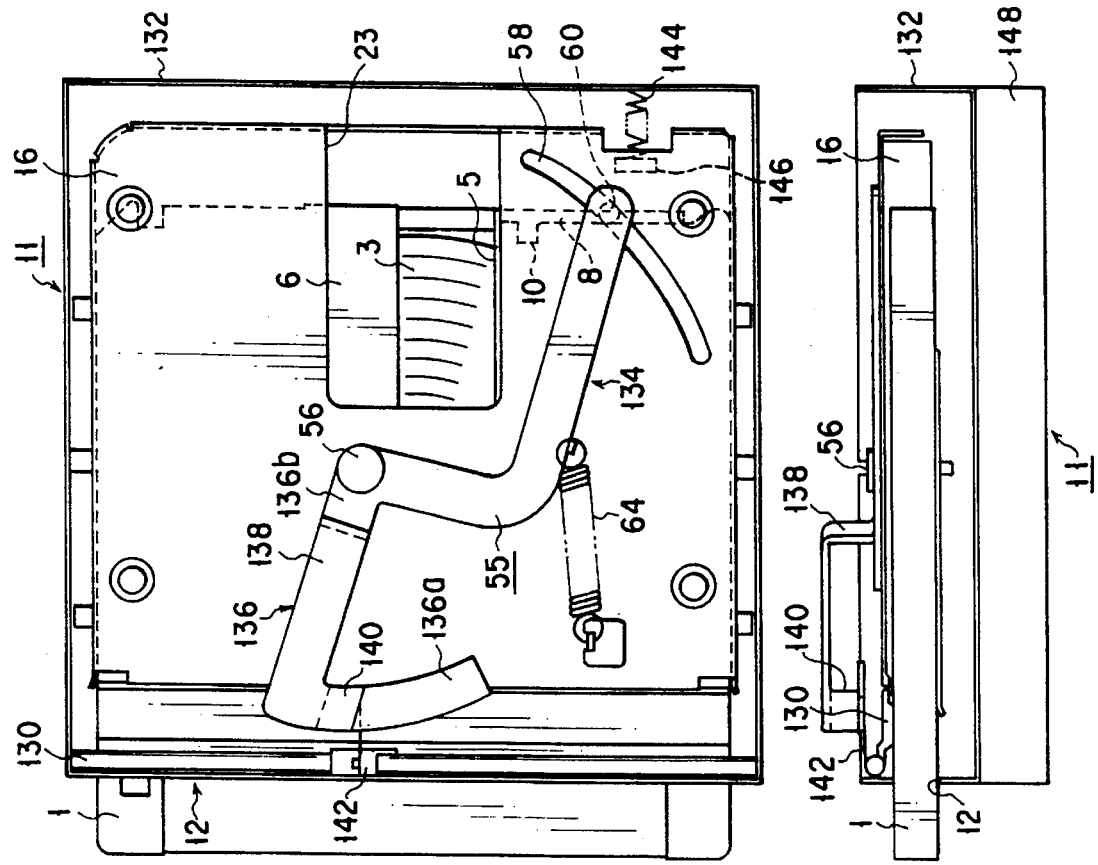

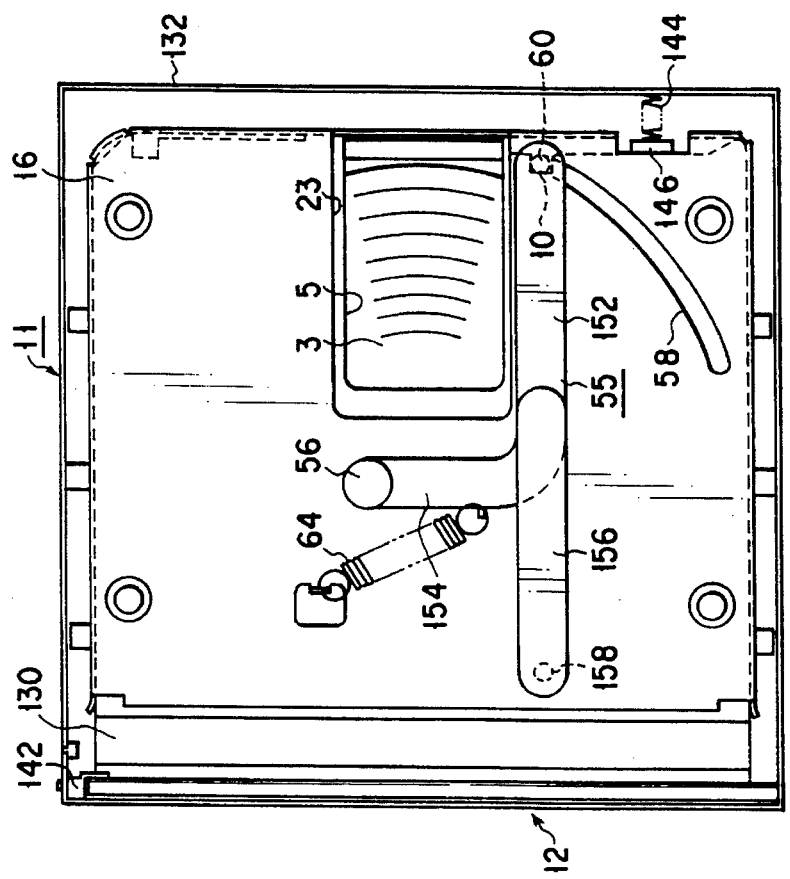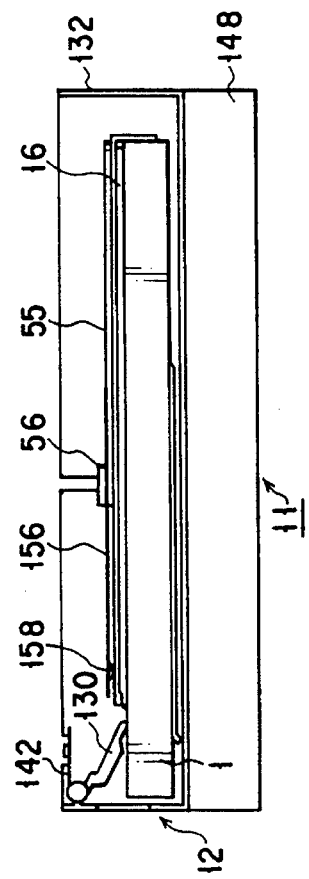
FIG. 37
FIG. 38

APPARATUS FOR LOADING A DATA RECORDING DISK

BACKGROUND OF THE INVENTION

1. Field of the Invention

The present invention relates to a disk loading apparatus for moving a disk cartridge between an ejection/insertion position and a loading position, said cartridge containing a data recording disk such as an optical disk or an optomagnetic disk. The disk loading apparatus is designed for use in a disk drive to recording data on a data recording disk and reproducing data therefrom.

2. Description of the Related Art

The disk loading apparatus can move the disk cartridge from the ejection/insertion position to the loading position, and vice versa, while holding the cartridge by means of a cartridge holder. At the ejection/insertion position, the cartridge can be inserted into, and ejected from, a slot made in one side of the housing of the disk drive. At the loading position within the housing of the disk drive, the data recording disk (hereinafter called "disk") is placed on the turntable connected to the spindle motor located in the housing. The disk loading apparatus can move the disk cartridge from the ejection/insertion position to the loading position, and vice versa, while holding the cartridge by means of a cartridge holder.

A disk loading apparatus of this type is disclosed in, for example, Jpn. Pat. Appln. KOKAI Publication No. 4-67461. This apparatus (hereinafter referred to as "first conventional apparatus") comprises a control lever. The control lever applies a pressure onto a side of a disk cartridge while the cartridge is being ejected from a disk drive, thereby preventing the cartridge from falling from the cartridge slot made in a side of the disk drive.

The first conventional apparatus further comprises a mechanism for stop applying the pressure onto the side of the disk cartridge. The mechanism has a detection lever which can rotate around at its one end, for detecting whether or not a disk cartridge is being inserted into the disk drive through the cartridge slot. When the cartridge is inserted into the disk drive to a predetermined depth, the detection lever contacts, at its abutting side, a pin protruding from the control lever. The detection lever therefore rotates the control lever away from the side of the disk cartridge, overcoming a bias for pushing the control lever onto the side of the cartridge. Thus, the control lever is separated from the side of the cartridge.

The first conventional apparatus is, however, disadvantageous in the following respects.

(1) Since the detection lever only rotates around its one end, the lever is unable to move along a straight line, the apparatus cannot be as thin as a disk loading apparatus (hereinafter referred to as "second conventional apparatus") disclosed in Jpn. Pat. Appln. KOKAI Publication No. 4-186554. In the second conventional apparatus, the detection lever not only rotate around its one end but also move along a straight line, thereby apply a pressure onto the side of a disk cartridge and also to open and close the shutter of the cartridge.

(2) The abutting side of the detection lever may fail to smoothly contact the pin of the control lever due to the dust accumulated on the contact side or the running out of lubricating oil. If this happens, the bias applied on the control lever is not sufficient enough to eject the disk cartridge from the disk drive.

(3) Since the bias on the control lever is suddenly applied to the detection lever when the pin of the control lever abuts the abutting side of the detection lever. Consequently, the pressure on the cartridge by the control lever increases or decreases abruptly, making smooth insertion or ejection of the cartridge impossible.

Another disk loading apparatus is disclosed in Jpn. Pat. Appln. KOKAI Publication No. 4-137256. The apparatus (hereinafter referred to as "third conventional apparatus") has an opening/closing arm. The arm is designed to eject a disk cartridge from a disk drive and also to open and close the shutter of the cartridge. The arm is set in engagement with a damper, which helps the arm to move smoothly such that the cartridge is prevented from jumping from the cartridge slot of the disk drive.

Still another disk loading apparatus is disclosed in Jpn. Pat. Appln. KOKAI Publication No. 4-168673. The apparatus (hereinafter referred to as "fourth conventional apparatus") has a drive plate for moving a cartridge holder between an ejection/insertion position and a loading position and, to thereby move a disk cartridge between these two positions. The drive plate is always biased toward the ejection/insertion position and placed in engagement with a rotary damper. Engaged with the rotary damper, the drive plate reduces the speed at which the disk is moved relative to a turntable as it is mounted onto the turntable. This minimizes the impact which disk and the spindle motor connected to the turntable exert to each other and, ultimately, servers to enhance the durability of the apparatus.

A disk loading apparatus is disclosed in Jpn. Pat. Appln. KOKAI Publication No. 4-109487. The apparatus (hereinafter referred to as "fifth conventional apparatus") comprises a shutter for opening and closing the cartridge slot made in one side of the housing of a disk drive. The shutter is rotatably supported between the slot-opening direction and the slot-closing direction. The fifth conventional apparatus further comprises a spring stretched between the shutter and the wall of the housing. This spring urges the shutter to the slot-closing position.

The third to fifth conventional apparatuses, how ever, need some improvement to be put to practical use.

SUMMARY OF THE INVENTION

In view of the forgoing, the object of the present invention is to provide a disk loading apparatus which is suitable for use in a thin disk drive, while retaining the advantages of the conventional apparatuses described above, and which can smoothly eject a disk cartridge from a disk drive and smoothly insert the cartridge into the disk drive.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a top view showing the relationship which the drive plate and the trigger lever, both used in the apparatus, assume when the disk cartridge is ejected from the disk drive;

FIG. 8 is a top view showing the relationship which the drive plate and the trigger lever have when the disk cartridge is loaded in the disk drive;

FIG. 9 is a top view showing the relationship which the components of the shutter opening/closing mechanism incorporated in the apparatus assume before the disk cartridge is held by the holder incorporated in the disk loading apparatus;

FIG. 10 is a top view illustrating the relationship which the components of the mechanism shown in FIG. 9 assume when they hold the shutter of the cartridge at the open position;

FIG. 11 is a graph representing the relationship between a force pushing the cartridge sideways and a force moving the cartridge in the direction of insertion;

FIG. 12 is a top view showing the relationship which the components of the shutter opening/closing mechanism incorporated in the disk loading apparatus according to a second embodiment of the invention assume before a disk cartridge is held by the holder incorporated in the second embodiment;

FIG. 13 is a top view indicating the relationship which the components of the mechanism shown in FIG. 12 assume when they hold the shutter of the cartridge at the open position;

FIG. 23 is a sectional view of a disk loading apparatus according to a fifth embodiment of this invention, taken along a horizontal plane, illustrating the relationship the components of the apparatus have when no disk cartridge is inserted into the apparatus;

FIG. 24 is a sectional view illustrating the apparatus of FIG. 23 in the condition of FIG. 23, taken along a vertical plane;

FIG. 29 is also a sectional view of the apparatus shown in FIG. 23, taken along a horizontal plane, indicating one end of the door spring contacts the inclined surface of an operating portion;

FIG. 30 is a sectional view showing the apparatus of FIG. 23 in the condition of FIG. 29, taken along a vertical plane;

FIG. 37 is a sectional view of a disk loading apparatus according to a sixth embodiment of the present invention, taken along a horizontal plane, showing a disk cartridge held in the loading position;

FIG. 38 is a sectional view showing the apparatus of FIG. 37 in the condition of FIG. 37, taken along a vertical plane;

DETAILED DESCRIPTION OF THE PREFERRED EMBODIMENTS

Several preferred embodiments of the present invention, i.e., disk loading apparatuses, will be described in the following, with reference to the accompanying drawings.

Figure 1:
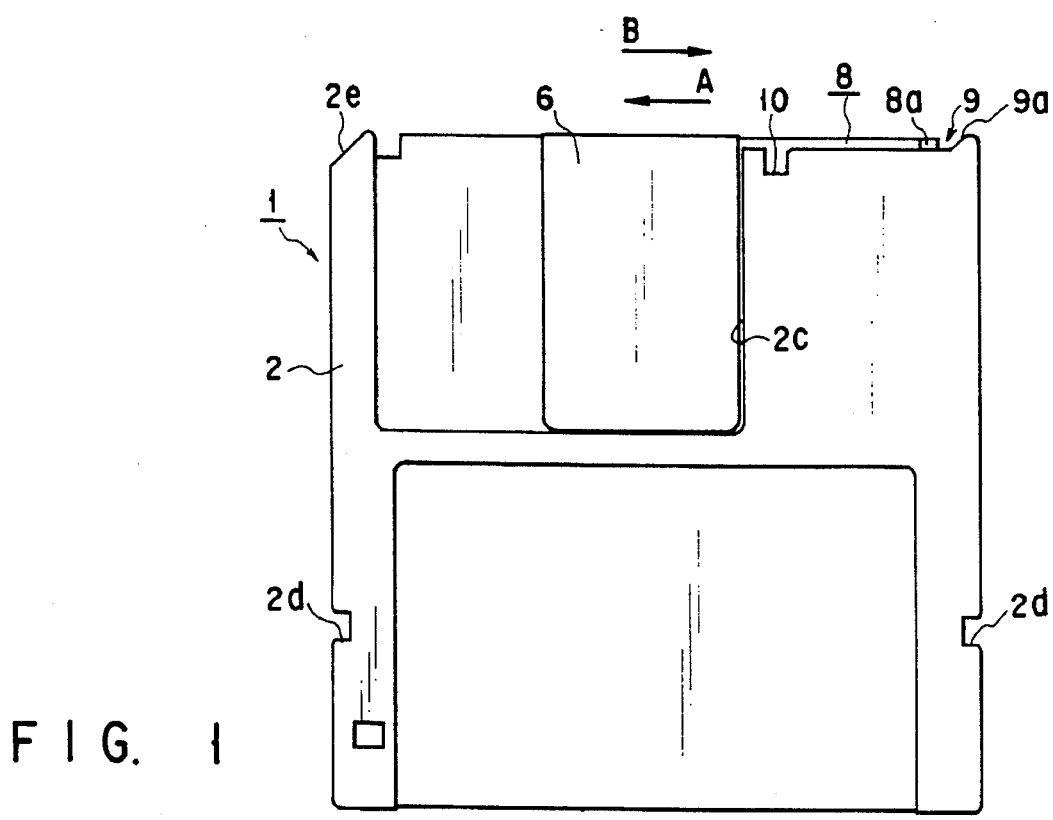
FIG. 1 is a top view of a disk cartridge of general type.
Figure 2:
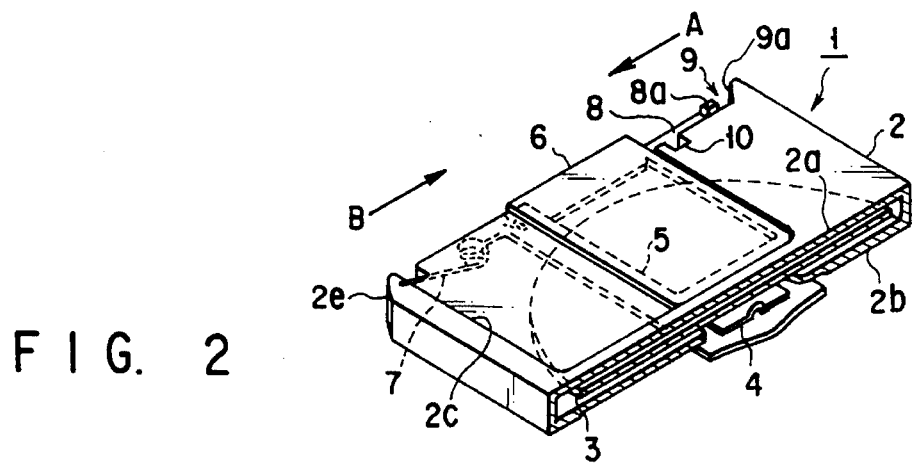
FIG. 2 is a perspective, sectional view of the disk cartridge shown in FIG. 1.
Figure 3:
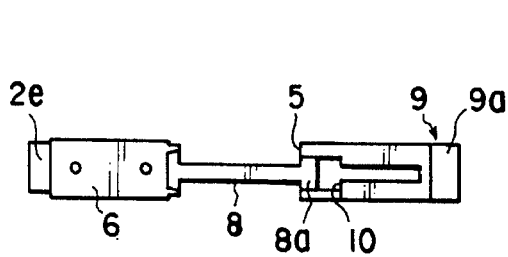
FIG. 3 is a front view of the disk cartridge shown in FIG. 1.

A disk cartridge which each apparatus according to the invention is to load in a disk drive, will be described first, with reference to FIGS. 1 to 3. As shown in FIG. 1, the cartridge 1 comprises a substantially rectangular thin case 2 which is made of hard plastics or the like and which is relatively thin. As shown in FIG. 2, the case 2 contains a data recording disk 3 (hereinafter called "disk") such as an optical disk or an optomagnetic disk.

The disk 3 is a so-called "single-sided" disk. As shown in FIG. 2, a hub 4 is secured to the center portion of the disk 3, covering this portion. The hub 4 has a through hole, into which the shaft of a spindle motor (later described).

The case 2 comprises an upper wall 2a and a lower 2b which are spaced apart from each other, defining a space accommodating the disk 3. The upper wall 2a has a rectangular window 5 which extends from the front edge of the case 2 at right angles thereto, almost reaching the hub 4 of the disk 3 contained in the cartridge 2. Through the window 5, part of the disk 2 can be exposed.

A shutter 6 having a U-shaped cross section is mounted on the front half of the disk 2. More precisely, the two parallel portions of the shutter 6 are slidably mounted in the two rectangular shallow recesses 2c which are formed in the front halves of the walls 2a and 2b and which have a depth substantially equal to the thickness of the parallel portions of the shutter 6. Hence, the shutter 6 can be moved in the directions of arrows A and B shown in FIG. 1. The shutter 6 is wider than the windows 5.

When the shutter 6 is moved in the direction of the arrow B to a window-closing position as shown in FIG. 2, it completely covers the window 5, shielding the disk 3 from outside. In the window-closing position, the shutter 6 abuts at its right edge on the right edges of the recesses 2c and cannot be further moved to the right. When the shutter 6 is moved in the direction of the arrow A to a window-opening position, it opens the window 5, thus exposing part of the disk 3 via the window 5. In the window-opening position, the shutter 6 abuts at its left edge on the left edges of the recesses 2c and cannot be further moved to the left.

As shown in FIG. 2, a formed spring 7 is secured at one end to the case 2, always biasing the shutter 6 in the direction of the arrow B. Unless a force is applied to the shutter 6 in the direction of the arrow A, the shutter 6 remains in the window-closing position.

As shown in FIG. 1, a slider 8 is connected at its proximal end to the right end of a front-end wall of the shutter 6 which connects the parallel portions. The distal end of the slider 8 has a projection 8a extending upwards (i.e., along a line perpendicular to the plane of the drawing). A shutter-opening groove 9 is made in the right end portion of the front edge of the case 2. The right end of the front edge has an inclined face 9a for guiding a pin 60 (later described) onto the projection 8a of the slider 8.

Figure 4:
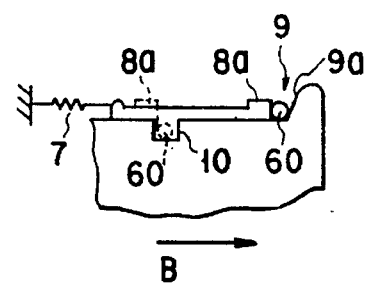
FIG. 4 is a front view showing a part of the cartridge, illustrating a pin inserted in a U-notch of the shutter of the cartridge.

A U-notch 10 is cut in the front edge of the case 2, for receiving a pin 60 which will be described later. When the pin 60 slips into the U-notch 10 as shown in FIG. 4, the slider 8 can no longer move in the direction of the arrow B, thus holding the shutter 6 (shown in FIGS. 1 and 2) in the opening position.

As is best shown in FIG. 1, two gripper slots 2d are cut, one in each side portions of both walls 2a and 2b (FIG. 2) of the case 2. These slots 2d serve to pull the cartridge 1 out of a disk drive installed in, for example, a jukebox. The front-left corner of the case 2 is cut slantwise, forming an inclined face 2e which serves to insert the cartridge 1 into the disk drive in the correct position only.

A disk drive 11 for recording data on, and reproduce data from, the disk 3 contained in the cartridge 1 described above will be described with reference to FIGS. 5 and 6.

Figure 5:
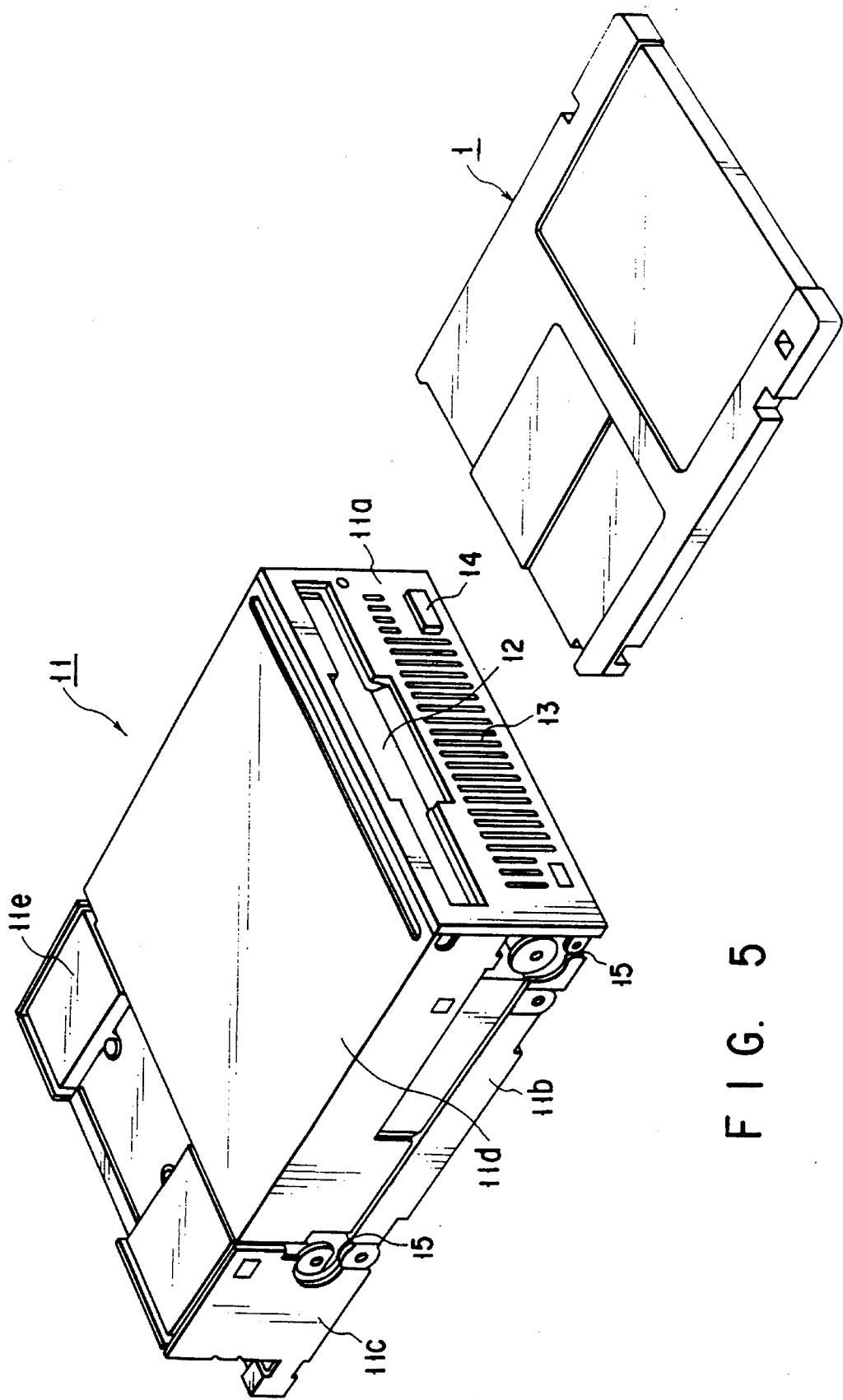
FIG. 5 is a perspective view showing a disk drive and a disk cartridge, said disk drive incorporating a disk loading apparatus according to a first embodiment of the present invention.

As shown in FIG. 5, the disk drive 5 has a front panel 11a, a bottom panel 11b, a first top cover 11d and a second top cover 11e. The panels 11a and 11b and the covers 11d and 11e constitute a housing. The front panel 11a has a slot 12 through which the cartridge 1 is inserted into and ejected from the disk drive 11. Below the cartridge slot 12 there are made a number of vertically elongated ventilation holes 13 in the front panel 11a. An eject button 14 is mounted on the front panel 11a, which is to be pushed in order to eject the cartridge 1 out of the disk drive 11 through the slot 12.

On the bottom panel 11b there are mounted various internal components of the drive 11, such as an optical head and a drive mechanism including a spindle motor. These components are secured to the bottom panel 11b by means of fasteners 11c. They are covered by the first top cover 11d, which is connected by to the bottom panel 11b by a plurality of insulators 15. The second top panel 11e is located at the back of the first top cover 11d; it covers the various electric components mounted on the bottom panel 11b.

The drive mechanism mounted on the bottom panel 11b will be described, with reference to FIG. 6. A magnetic head 20 is attached to the lower surface of a head holder 19 at the $X_1$-side portion thereof, for applying a bias magnetic field onto the disk 3 (FIG. 2). The head holder 19 has two rectangular holes in the $X_1$-side portion, located in the both side regions of the magnetic head 20. A filter 21 is provided in each of these holes.

The $Y_1$- and $Y_2$-side portions of the head holder 19 are bent downwards, forming two parallel side walls. Two guide pins 22 (only one shown in FIG. 6) protrude horizontally from the inner surface of each side wall.

A cartridge holder 16 is arranged beneath the head holder 19. A shutter opening/closing mechanism 17, described later in detail, is mounted on the upper surface of the cartridge holder 16. The cartridge holder 16 has a rectangular opening 23 in the $X_1$-side end portion, in which the magnetic head 20 is located. The $Y_1$- and $Y_2$-side portions of the cartridge holder 16 are bent downwards, forming two parallel side walls. Two U-notches 24 are made in the lower edge of each side wall, which receive the guide pins 22 of the head holder 19. Two guide pins 25 protrude horizontally from the outer surface of each side wall, at the middle portion thereof.

A partition 26 is arranged below the cartridge holder 16. A drive plate 27 is mounted on the upper surface of the partition 26. The drive plate 27 has two elongated notches and two prolonged holes (one of which is a slit 52 shown in FIGS. 7 and 8) extending along an X axis, two holes from the $X_1$-side of the plate 27 and the other two notches from the $X_2$-side of the plate 27. Two guide pins 28 protrude upwards from the partition 26 through the notches made in the $X_2$-side of the plate 27, and two other guide pins 29 protrude upwards from the partition 26 through the holes made in the $X_1$-side of the plate 27. Hence, the drive plate 27 can move along the X axis, guided by the pins 28 and 29, for the distance equal to the length of the elongated holes. Not only do the guide pins 28 and 29 guide the drive plate 27 along the X axis, but do the holes and the notches serve to load the cartridge 1 in a correct position in the disk drive 11.

An extension coil spring 30 is stretched between the partition 26 and the drive plate 27, at $X_2$-sides of the partition 26 and the plate 27, biasing the drive plate 27 such that the drive plate 27 returns back to the initial position after having moved with respect to the partition 26. Another identical extension coil spring may be arranged at the $X_1$-sides of the partition 26 and the plate 27.

A trigger mechanism 49 is coupled to the drive plate 27. As shown in FIGS. 7 and 8, the trigger mechanism 49 has an L-shaped trigger lever 51, which can rotate around an axle 50. The distal end 51a of the trigger lever 51 can be set in engagement with the slit 52 made in the drive plate 27 and extending along the X axis. The proximal end 51b of the trigger lever 51 can abuts on the cartridge 1 (FIG. 6) being inserted into the cartridge holder 16. A compression coil spring 53 is connected at one end to the proximal end 51b of the lever 51, and at the other end to the first top cover 11d (FIG. 5). Therefore, the trigger lever 51 is biased to rotate counterclockwise around the axle 50 —that is, in the direction of an arrow $D_2$ in FIGS. 7 and 8.

As shown in FIG. 7, the distal end 51a of the trigger lever 51 remains in the notch 52a continuous to the slit 52 made in the drive plate 27, until the disk cartridge 1 is inserted into the cartridge holder 16. As long as the distal end 51a of the lever 51 is held in the notch 52a, the drive plate 27 is fixed to the partition 26 and located at the $X_1$-side of the partition 26.

When the disk cartridge 1 is inserted into the cartridge holder 16, abutting on the proximal end 51b of the trigger lever 51 as shown in FIG. 8, the trigger lever 51 is rotated clockwise against the bias of the compression coil spring 53—that is, in the direction of an arrow $D_1$. As a result, the distal end 51a of the lever 51 is released from the notch 52a which is continuous to the slit 52 of the drive plate 27. The drive plate 27 biased by the spring 30 in the direction of an arrow $X_2$ is thereby moved in this direction, and the distal end 51a of the trigger lever 51 goes into engagement with the $X_1$-side end of the slit 52 of the drive plate 27. Thus, the drive plate 27 is held in place after having moved in the cartridge-ejecting direction (i.e., the direction of the arrow $X_2$).

Figure 6:
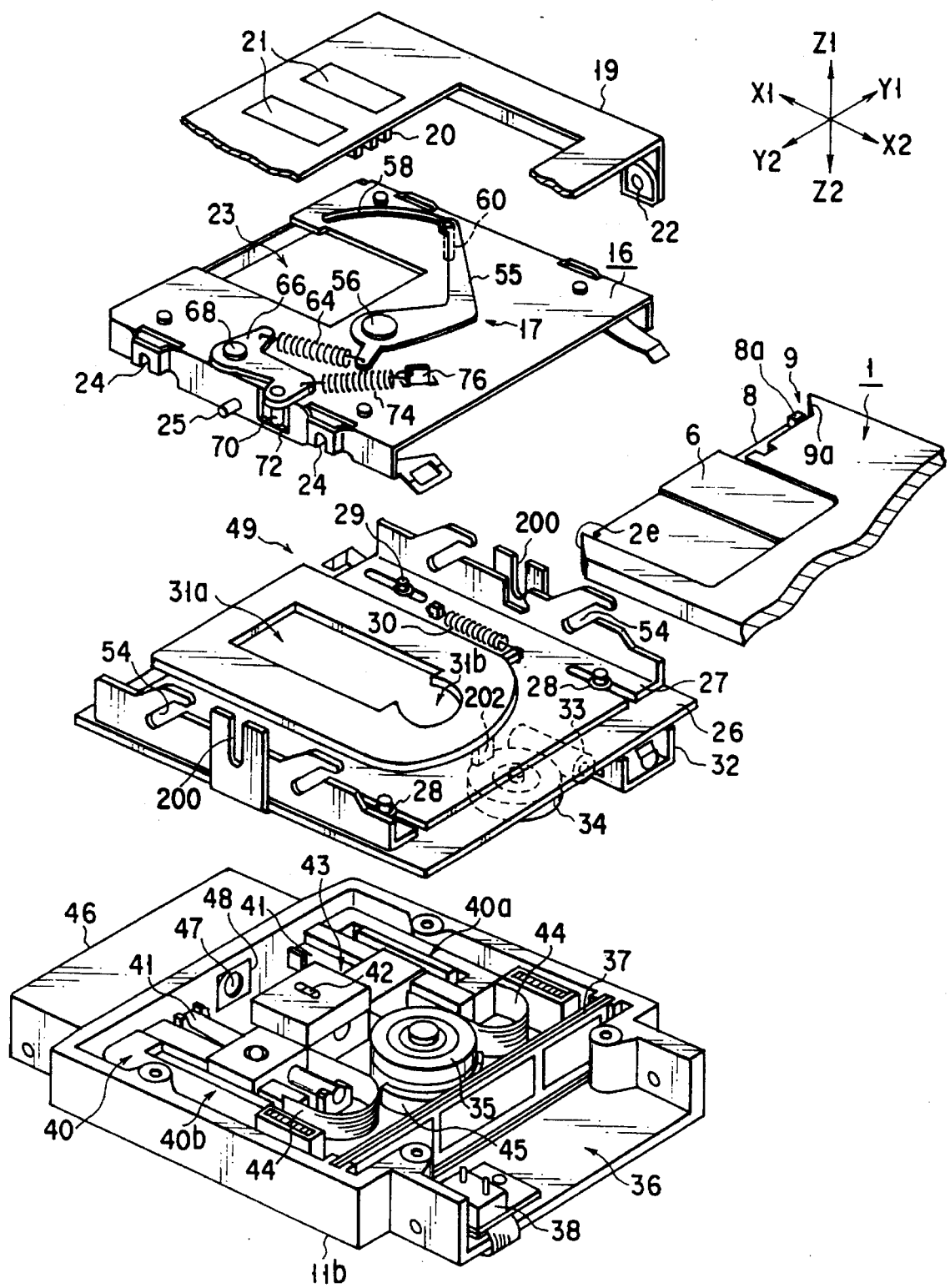
FIG. 6 is an exploded view of the disk drive shown in FIG. 5.

As shown in FIG. 6, the partition 26 has a substantially rectangular hole 31a in the $X_1$-side half. The hole 31a allows an optical head 43 (later described) to protrude upwards without contacting the partition 26. The partition 26 also has a substantially circular hole 51b made in the $X_2$-side half and continuous to the hole 31a. This hole 31b allows a turntable (later described) to protrude upwards without contacting the partition 26.

That portion of the partition 26 which surrounds the holes 31a and 31b is raised above the $Y_1$-, $Y_2$- and $X_2$-side portions of the partition 26 which form a substantially U-shaped member. The drive plate 27 has a U-shaped cutout, through which the raised portion of the partition 26 protrude without touching the drive plate 27.

A drive device for loading the cartridge 1 is located on the lower surface of the $X_2$-side half of the partition 26. The drive device comprises an electric motor 32, a worm-gear unit 33, and a cam 34 in mesh with the worm-gear unit 33.

Arranged below the partition 26 is an optical deck section which is mounted on the bottom panel 11b. The bottom panel 11b is made of die-cast aluminum and shaped like a shallow open box. The spindle motor 35 is mounted on the center part of the bottom panel 11b. The motor 35 is used for holding and rotating the disk 3 contained in the cartridge 1. The bottom panel 11b has an opening 36 in the $X_2$-side end portion. Provided in the opening 36 are: the drive device comprising the motor 32, the worm-gear unit 33 and the cam 34, and also a filter 37, and a detector 38. The filter 37 is used to apply clear air onto the optical head 43. The detector 38 is designed to detect whether or not the cartridge 1 has been write-protected. The filter 37 is positioned at the $X_1$-side of the drive device (32 to 34). Otherwise, holes should be made in the filter 37 through which to lead wires, and dust would then inevitably penetrate into the box-shaped bottom panel 11b.

The optical head 43 has an objective lens 42. The head 43 can be driven by a voice coil motor (VCM) 40 along two parallel guide rails 41. The guide rails 41 are inserted at one end portion in the holes formed in the $X_1$-side wall of the bottom panel 11b and supported at the other end portion by two productions protruding upwards from the bottom panel 11b. The optical head 43 is supported by bearings (i.e., rollers) which are mounted on the guide rails 41.

The VCM 40 has two magnetic circuits 40a and 40b spaced apart from each other along the Y axis and located in the side regions of the optical head 43. Each of the circuits 40a and 40b comprises an inner yoke, an outer yoke, a magnet, and a coil wound around a short pipe made of copper. The coils of the magnetic circuits 40a and 40b are secured by adhesive to the $Y_1$- and $Y_2$-side ends of a carriage supporting the optical head 43, respectively. One side of each coil is located in the space between the inner yoke and the outer yoke without contacting each other. When electric currents flow through the coils, the coils generate a thrust, which drives the optical head 43 along the guide rails 41—that is, in a tracking direction.

The optical head 43 contains an actuator for driving the objective lens 42 in a beam-focusing direction and in the tracking direction. The actuator electrically connected by an FPC 44 to an electric circuit (not shown). A plastic cover 45 surrounds the lower portion of the spindle motor 35, preventing the FPC 44 from contacting the spindle motor 35.

A fixed optical system 46 is mounted on the $X_1$-side of the bottom panel 11b. The system 46 comprises a laser diode, a photodetector, and the like. The bottom panel 11b has an opening 47, which is covered with a glass cover 48. The optical system 46 is positioned such that the laser beam emitted from the laser diode travels into the optical head 43 through the opening 47 and the glass cover 48. In the optical head 43, the beam is reflected by a reflector prism toward the objective lens 42. The lens 42 focuses the laser beam onto the disk 3 contained in the cartridge 1, forming a light spot on the recording surface of the disk 3.

The operation of the disk drive 11 described above will be explained.

First, when the cartridge 1 is inserted into the cartridge slot 12 shown in FIG. 5, its front edge pushes the proximal end 51b of the trigger lever 51 shown in FIG. 7. The lever 51 is thereby rotated in the direction of the arrow $D_1$. Hence, the distal end 51a of the lever 51 comes out of the engagement with the notch 52a continuous to the slit 52 of the drive plate 27, allowing the drive plate 27 to move in the direction of the arrow $X_2$ due to the bias of the extension spring 30.

As shown in FIG. 6, both side walls of the drive plate 27 have a U-notch 54 each, which is inclined downwards toward $X_1$-side of the drive plate 26. The guide pins 22 of the head holder 19 are loosely fitted in the inclined U-notches 54 of the drive plate 27, respectively. The partition 26 has two projections protruding upwards from the $Y_1$- and $Y_2$-side edges. Each projection has a vertical U-notch 200. The guide pins 25 of the cartridge holder 16 are loosely fitted in the vertical U-notches 200 of the projections.

Due to the U-notches 54 of the side walls of the drive plate 27, which are inclined downwards toward $X_1$-side of the plate 26, both the cartridge holder 16 and the head holder 19 moves downwards as the drive plate 27 is moved by the spring 30 in the direction of the arrow $X_2$. As a result of this, the cartridge 1 in the cartridge holder 16 abuts on the heads of guide pins 28 and 29 and is stopped, and the disk 3 contained in the cartridge 1 is connected to the spindle motor 35.

As the head holder 19 is further moved downwards, the lower surface of the head holder 19 is brought into contact with the upper surface of the partition 26, thereby placing the magnetic head 20 at a predetermined position. The loading of the disk 3 is thus completed. Then, data can be recorded on the disk 3 or reproduced therefrom.

When an operator pushes the eject button 14 mounted on the front panel 11a after data has been recorded on the disk 3 or reproduced from the disk 3, the spindle motor 35 is stopped. Simultaneously, the drive device (32 to 34) is actuated, pushing the projections 202 formed integral with the drive plate 27. The drive plate 27 is thereby moved in the direction of the arrow $X_1$ against the bias of the spring 30, whereby the head holder 19 is moved upwards, and then the cartridge holder 16 is moved upwards.

When the drive plate 27 reaches the position shown in FIG. 7, the trigger lever 51 is rotated in the direction of the arrow $D_2$, due to the bias of the compression coil spring 53. The distal end 51a of the lever 5 moves into the notch 52a continuous to the slit 52 of the drive plate 27. The drive plate 27 is thereby fastened to the partition 26. At this time, the cartridge 1 is pushed by not only the spring 63 but also a shutter-opening spring 64 (later described), and is ejected from the disk drive 11 through the cartridge slot 12. The drive plate 27 is further driven by the drive device (32 to 34), whereby the disk drive 11 is made ready to receive and drive the cartridge 1 again and a another disk cartridge.

The shutter opening/closing mechanism 17 will be described in detail, with reference to FIG. 9.

As shown in FIG. 9, the mechanism 17 has a first lever 55 shaped like an arm bent at the middle and designed to open and close the shutter 6 of the disk cartridge 1. The first lever 55 has a through hole in its proximal end. A shaft 56 is inserted at one end in the through hole and fastened at the other end to the cartridge holder 16 (hereinafter referred to as "holder"). The first lever 55 can therefore rotate around the shaft 56, with respect to the holder 16.

A groove 58 is formed in the holder 16 in the $Y_1$-side, extending from a region near the rectangular opening 23 toward the $Y_1$-side of the holder 16. The groove 58 is curved along a part of a locus the distal end of the first lever 55 draws when the lever 55 is rotated around the shaft 56. A pin 60 protrudes downwards from the distal end of the first lever 55 and is loosely fitted in the curved groove 58. As seen from FIG. 9, the pin 60 is aligned with the shutter-opeing groove 9 of the cartridge 1 with respect to the Y axis, as long as the pin 60 remains at the $Y_1$-side end of the curved groove 58.

A projection 62 protrudes horizontally from the proximal end of the first lever 55. A shutter-closing spring 64, which is an extension coil spring, is connected at one end to the projection 62 and at the other end to one end of a second lever 66. The spring 64 biases the first lever 55 in the direction of an arrow C.

The second lever 66 is almost Z-shaped and has a through hole 66a in the portion near the end which is connected to the shutter-closing spring 64. A shaft 68 protrudes upwards from the holder 16 is inserted in the through hole 66a, so that the second lever 66 can rotate around the shaft 68. As shown in FIG. 6, a pin 70 projects downwards from the other end of the second lever 66 and is inserted in the opening 72 formed in the $Y_2$-side wall of the holder 16.

As shown in FIG. 9, the second lever 66 has a through hole 66b in its $X_2$-side end. One end of a brake spring 74, which is an extension coil spring, is fitted in the through hole 66b. The other end of the brake spring 74 is fastened to a projection 76 extending upwards from the holder 16. The brake spring 74 biases the second lever 66 counterclockwise—that is, in the direction of an arrow F. Thus, the pin 70 of the second lever 66 remains within the holder 16 and will slide on the $Y_2$-side edge of the cartridge 1.

The operation of the shutter opening/closing mechanism 17, described above, will be explained.

When the cartridge 1 is moved in the direction of the arrow $X_1$ and thus inserted into the holder 16 as illustrated in FIG. 9, the inclined face 2e of the cartridge 1 contacts the pin 70 protruding from the second lever 66. As the cartridge 1 is inserted deeper into the holder 16, the pin 70 is moved in the direction of the arrow $Y_2$, sliding on the inclined face 2a. The second lever 66 is thereby rotated clockwise, or in the direction of an arrow E, against the bias of the brake spring 74. The pin 70 applies a pressure onto the $Y_2$-side edge of the cartridge 1, pushing the cartridge 1 in the direction of the arrow $Y_1$.

When the cartridge 1 is further inserted deeper, the pin 60 of the first lever 55 slips into the shutter-opening groove 9 of the cartridge 1 and abuts on the the inclined face 9a of the opening groove 9. Then, the pin 60 slides on the $X_1$-side edge of the cartridge 1, moving the slider 8 in the direction of the arrow $Y_2$.

In the meantime, the first lever 55 is rotated in the direction of the arrow D against the bias of the shutter-closing spring 64. As the cartridge 1 is inserted further, the first lever 55 keeps rotating counter clockwise, whereby the pin 60 pushes the slider 8 in the direction of the arrow $Y_2$. Therefore, the shutter 6 is moved to its open position. When the pin 60 reaches the Y$_2$-side end of the curved groove 58, the shutter 6 reaches its open position, thereby opening up the window 5 of the cartridge 1. Through the window 5 thus opened, part of the disk 3 can be exposed.

While the first lever 55 is rotating in the direction of the arrow D against the bias of the shutter-closing spring 64, the spring 64 pulls the second lever 66, rotating the same in the direction of the arrow E. The bias rotating the second lever 66 in the direction of the arrow E gradually increases as the first lever 55 rotates in the direction of the arrow D.

The bias of the shutter-opening spring 64 rotates the second lever 66 clockwise (i.e., in the direction of the arrow E), whereas the bias of the brake spring 74 rotates the second lever 66 counterclockwise (i.e., in the direction of the arrow F). Hence, when the first lever 55 is rotated in the direction of the arrow D, the pushing force of the pin 70 which acts on the Y$_2$-side of the cartridge 1 decreases. As indicated above, the bias rotating the lever 66 in the direction of the arrow E gradually increases as the first lever 55 rotates in the direction of the arrow D. It follows that the pushing force of the pin 70 decreases as the cartridge 1 is inserted deeper into the holder 16 in the direction of the arrow X$_1$.

This decrease in the pushing force of the pin 70 depends on the position the first lever 55 takes while being rotated. The pushing force of the pin 70 changes continuously and smoothly while the first lever 55 is being rotated. The cartridge 1 can therefore be inserted smoothly. FIG. 11 represents the relationship between the force F$_1$ the pin 70 exerts and the depth F$_2$ to which the cartridge 1 has been inserted. As evident from FIG. 11, the force F$_1$ gradually decreases as the cartridge 1 is moved from the insertion-start position G to the loading position H. The force F$_1$ has decreased to almost nil when the cartridge 1 reaches the loading position H. Since the force F$_1$ is maximal when the cartridge 1 is at the insertion-start position G, the cartridge 1 is prevented from jumping from the holder 16 to fall from the disk drive 11.

Since no mechanical contact occurs between the levers 55 and 66, these levers do not hinder each other's motion. Even if dust or other matter accumulates on the levers 55 and 66, the first lever 55 is readily rotated back to its initial position by virtue of the bias of the shutter-closing spring 64. The disk loading apparatus remain reliable over a long use, in ejecting the cartridge 1 whenever necessary.

In this embodiment, the pin 70 also serves to allow the cartridge 1 to be inserted into the holder 16 only when it assumes the correct position. The pin 70 rotates the second lever 66 as it slides on the inclined face 2e formed at the front-left corner of the cartridge 1. No inclined faces are formed at the other three corners of the cartridge 1. Thus, if the operator inserts the cartridge 1 into the cartridge slot 12, holding the cartridge 1 the wrong way, e.g., upside-down, the pin 70 abuts on any corner having no inclined surface, preventing further insertion of the cartridge 1.

Another disk loading apparatus according to a second embodiment of the invention will be described, with reference to FIGS. 12 and 13. The components of the second embodiment, which are similar or identical to those of the first embodiment, are designated at the same reference numerals and will not be described in detail.

In the second embodiment, the first lever 55 not only rotates but also moves linearly, whereas it rotates only in the first embodiment.

As shown in FIG. 12, a straight groove 78 is formed in the upper surface of the holder 16. The groove 78 is continuous to the X$_1$-side end of the curved groove 58 and is slightly inclined to the X axis. A short groove 80 is also made in the upper surface of the holder 16, extending from the X$_1$-side end of the inclined straight groove 78 in the direction of the arrow Y$_2$. A guide pin 82 protrudes downwards from the proximal end of the first lever 55 and is loosely inserted in a guide groove 84 formed in the upper surface of the holder 16. The guide pin 82 extends downwards for such a distance as not to touch the cartridge 1 inserted into the holder 16.

A spring-holding member 86 is connected to the proximal end of the first lever 55. Fastened to the member 86 is one end of a shutter-closing spring which is a torsion spring 64. The spring 64 has a looped middle portion, which is wound around spring-holding projections 88 extending upwards from the upper surface of the holder 16. The other end of the shutter-closing spring 64 is secured to the pin 90 which protrudes upwards from the second lever 66. The shutter-closing spring 64 applies bias on the first lever 55 to rotate the same clockwise, or in the direction of an arrow I.

Except for the features described in the three preceding paragraphs, the second embodiment is identical to the first.

The operation of the second embodiment will be explained. When an operator inserts a cartridge 1 into the holder 16 in the direction of the arrow X$_1$, the inclined face 2e of the cartridge 1 abuts on the pin 70 of the second lever 66. The pin 70 is pushed in the direction of the arrow Y$_2$, and the second lever 66 is rotated in the direction of the arrow E, against the bias of the brake spring 74.

As the cartridge 1 is inserted deeper into the holder 16, the pin 60 of the first lever 55 slips into the opening groove 9 of the cartridge 1, at a position closer to the X$_2$-side of the holder 16 than in the first embodiment. The first lever 55 is rotated around the guide pin 82. Thus, the pin 60 moves along the curved groove 58, pushing the slider 8 along the side of the cartridge 1 in the direction of the arrow Y$_2$. As the slider 8 is thus moved, the shutter 6 gradually opens the window 5 (FIG. 2). When the pin 60 reaches the Y$_2$-side end of the curved groove 58, the shutter 6 opens the window 5 by half or more.

Since the shutter 6 opens the window 5 greatly when the cartridge 1 is initially inserted into the holder 16, the magnetic head 20 (FIG. 6) can be exposed through the window 5 in the initial phase of the cartridge insertion. The distance for which the cartridge 1 and the magnetic head 20 are moved relative to each other is shorter than in the first embodiment by the depth of the window 5 shown in FIG. 2. The second embodiment can therefore serve to reduce the height of the disk drive 11.

Except for the points indicated above, the second embodiment is substantially identical in operation and advantage to the first embodiment.

In the first and second embodiments, as described above, the force the second lever exerts on the cartridge sideways decreases as the shutter-opening lever (i.e., the first lever) is moved. This results in the following advantages:

(1) Once the cartridge has been loaded into the holder, the force the second lever applies onto the cartridge sideways is decreased. Hence, the cartridge is prevented from being displaced sideways in the holder.

(2) While the cartridge remains loaded in the holder, the force exerted on it sideways is sufficiently small. The cartridge can therefore be smoothly moved from the loading position in the holder and can be readily ejected from the disk drive, so that the ejection can be operated without a fault.

(3) As the cartridge approaches the ejection position, the force applied onto it sideways gradually increases. Therefore, the cartridge is prevented from falling from the disk drive.

(4) Since the forces the first and second levers exert change continuously and gradually as the cartridge is moved in the holder. This enables an operator to insert the cartridge smoothly.

Still another disk loading apparatus according to a third embodiment of the invention will be described, with reference to FIGS. 14 and 15.

Figure 14:
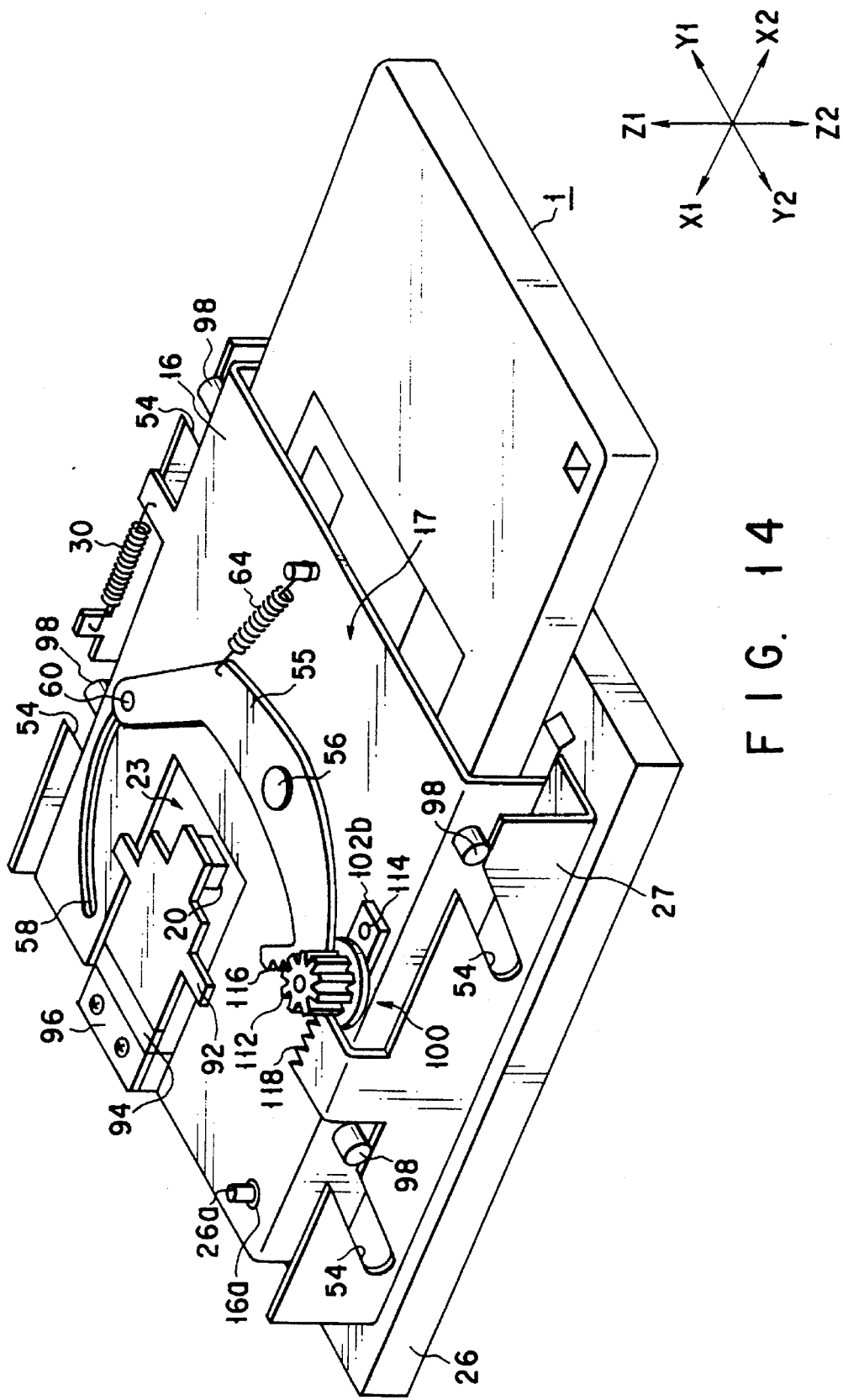
FIG. 14 is a perspective view illustrating the internal structure of the disk loading apparatus according to a third embodiment of the present invention.

As shown in FIG. 14, a magnetic head 20 is located above the rectangular opening 23 of the holder 16. The magnetic head 20 is supported on the distal end of an arm 92. The proximal end of the arm 92 is secured by a leaf spring 94 to a carriage 96. The carriage 96 can be moved along the X axis.

Two pins 98 protrude horizontally from each side of the holder 16 of the third embodiment. The pins 98 can be engaged with the inclined U-notches 54 made in the side walls of the drive plate 27. An extension coil spring 30 is stretched between the holder 16 and the drive plate 27, pulling the holder 16 and the plate 27 toward each other. A pin-like stopper 26a protrudes upwards from a partition 27, and the holder 16 has a through hole 16a. The stopper 26a is loosely fitted in the through hole 26a, whereby the holder 16 is prevented from moving along the X axes and can move up and down only.

The third embodiment has no component equivalent to the second lever 66; it has only one lever 55 which corresponds to the first lever used in the first and second embodiments. A shutter-closing spring 64 is connected at one end to the lever 55 and at the other end to the holder 16, thus biasing the lever 55 toward the holder 16.

A damper unit 100 is mounted on the holder 16. The unit 100 is a so-called rotary damper. As shown in FIG. 15, it has a housing 102 formed of a bottomed hollow cylinder 102a and two projections 102b extending sideways from the hollow cylinder 102a. The hollow cylinder 102a contains grease 104 and a friction plate 106. The grease 104 contacts the bottom of the hollow cylinder 102a. The friction plate 106 has a shaft 106a. A wavy washer 108 is mounted on the shaft 106a of the friction plate 106. Both the plate 106 and the washer 108 are located within the hollow cylinder 102a. A disk-shaped cover 110 is secured to the top of the hollow cylinder 102a, covering the grease 104, the friction plate 106 and the washer 108. The cover 110 has a through hole in the center portion, through which the shaft 106a of the friction plate 106 extends upwards, projecting from the cover 110. A gear 112 is fastened to the top end of the shaft 106a.

Figure 15:
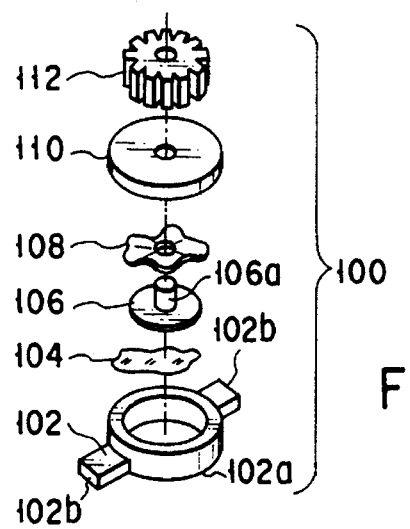
FIG. 15 is an exploded perspective view of the damper unit used in the disk loading apparatus of FIG. 14.

As can be understood from FIG. 15, the friction plate 106 is pushed onto the housing 102 by the wavy washer 108 and the cover 110. By virtue of its viscosity, the grease 104 applies a damping force on the rotation of the gear 112.

The projections 102b of the housing 102 are fastened to the holder 16 by means of screws 114 as shown in FIG. 14, whereby the damper unit 100 is secured to the holder 16.

Also as shown in FIG. 14, the arm 55 has a first lack 116 on its one end portion. The first lack 116 can be in mesh with the gear 112 of the damper unit 100. The drive plate 27 also has a second lack 118 which can be in mesh with the gear 112. Either the first lack 116 or the second lack 118 meshes with the gear 112 at a time. That is, both lacks cannot mesh with the gear 112 at the same time.

It will be explained how the third embodiment operates to load a cartridge 1.

Figure 16:
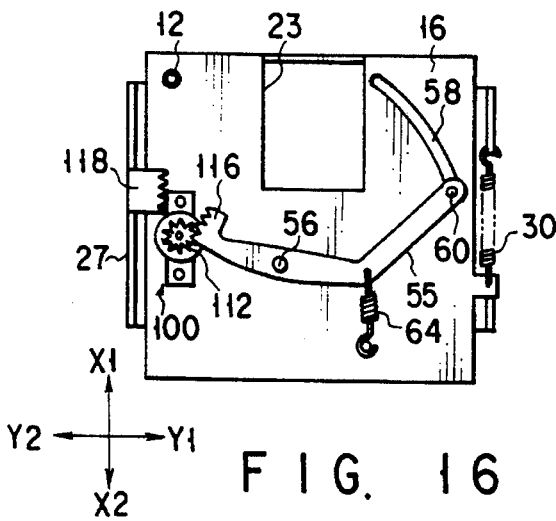
FIG. 16 is a top view showing the relationship which the components of the shutter opening/closing mechanism used in the apparatus of FIG. 14 assume when a disk cartridge is not held by the holder incorporated in the disk loading apparatus.

Until the cartridge 1 is inserted into the holder 16, the trigger mechanism (FIG. 6) holds the drive plate 27, preventing the plate 27 from moving in the direction of the arrow $X_2$, as illustrated in FIG. 16. The second lack 118 remains out of engagement with the gear 112.

Biased by a shutter-closing spring 64, the lever 55 is positioned with the pin 60 located in the $X_2$-side end of the curved groove 58 formed in the holder 16. The first lack 116 is in mesh with the gear 112.

Figure 17:
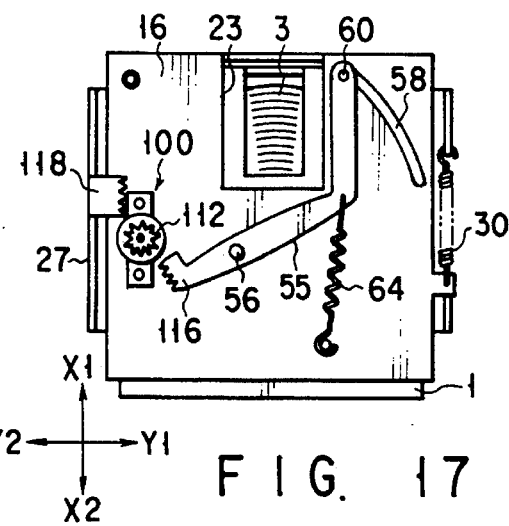
FIG. 17 is a top view showing the relationship which the components of the mechanism shown FIG. 16 have when they hold the shutter of a disk cartridge in an open position.

When the cartridge 1 is inserted into the holder 16, the pin 60 abuts on the slider 8 of the cartridge 1, pushing the shutter 6 open and rotating the arm 55 counterclockwise. Immediately after the cartridge 1 has been completely loaded, the first lack 116 comes out of mesh with the gear 112, the damper unit 100 is in engagement with neither the first lack 116 nor the second lack 118 as shown in FIG. 17. At this time, the trigger mechanism unlocks the drive plate 27. The drive plate 27 therefore moves in the direction of the arrow $X_1$, due to the bias of the extension coil spring 30 which is stretched between the holder 16 and the drive plate 27. The holder 16 is thereby lowered, placing the disk 3 contained in the cartridge 1 on the turntable connected to the shaft of the spindle motor, whereby the surface of the disk 3 approaches the magnetic head 20 shown in FIG. 14.

Figure 18:
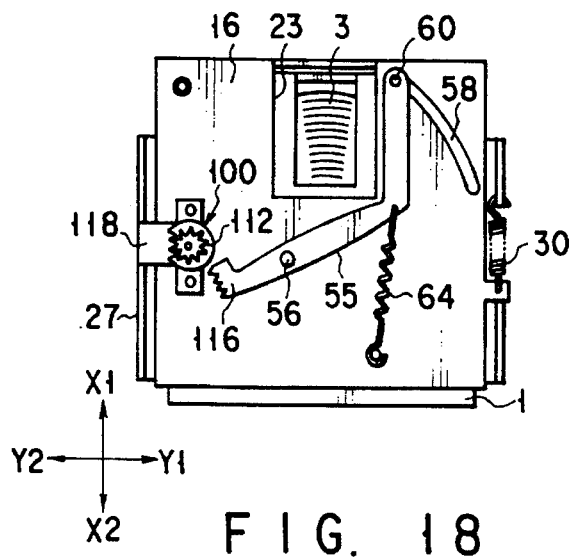
FIG. 18 is a top view illustrating the relationship which the components of the mechanism shown in FIG. 16 assume when the drive plate incorporated in the apparatus of FIG. 14 is moved with respect to the holder.

As the drive plate 27 starts moving in the direction of the arrow $X_1$, the second lack 118 goes into engagement with the gear 112 of the damper unit 100 as illustrated in FIG. 18. The unit 100 therefor applies a damping force on the drive plate 27, reducing the speed there of. As a result, the holder 16 moves downwards slowly. Since the first lack 116 remains spaced from the gear 112, it does not hinder whatever motion of the second lack 118.

Since the damper unit 100 applies a damping force on the drive plate 27 while the cartridge 1 is being inserted into the holder 16, the speed is reduced at which the disk 3 is moved toward the turntable connected to the spindle motor.

It will be explained how the third embodiment operates to eject the cartridge 1.

To eject the cartridge 1 from the disk drive 11 after data has been recorded on the disk 3 or reproduced therefrom, the drive plate 27 is moved in the direction of the arrow $X_2$, either by hand or an electric drive. Then, the holder 16 is moved upwards, and the pin 60 of the lever 55 pushes the cartridge 1 in the direction of the arrow $X_2$. At this time, the second lack 118 is out of contact with the gear 112 of the damper unit 100 whereby the movement of the first lack 116 is not prevented.

As the lever 55 starts rotating, the first lack 116 goes into engagement with the gear 112, whereby the damper unit 100 applies a damping force on the lever 55. Hence, the lever 55 is rotated slowly, preventing the cartridge 1 from jumping out of the disk drive.

Another disk loading apparatus according to a fourth embodiment of the invention will be described, with reference to FIGS. 19 to 22. In the fourth embodiment, a damping force is applied to only the components which need to be damped, so that the disk loading apparatus operates more lightly than otherwise.

As shown in FIGS. 19 to 22, a damper arm 120, not a gear, is connected to a damper unit 100 which is also a rotary damper. More precisely, the arm 120 is secured at its proximal end to the shaft of the damper unit 100. Two pins 122 and 124 protrude upwards from the distal end and middle portion of the damper arm 120, respectively. A lever 55 has a distal end portion 126 which narrows toward the distal end. The drive plate 27 has a engagement strip 128 which is arranged above the holder 16 which extends in the direction of the arrow $Y_1$. The distal end portion 126 of the lever 55 can contact the pin 122, and the strip 128 can contact the pin 124.

The operation of the fourth embodiment will be explained.

Figure 19:
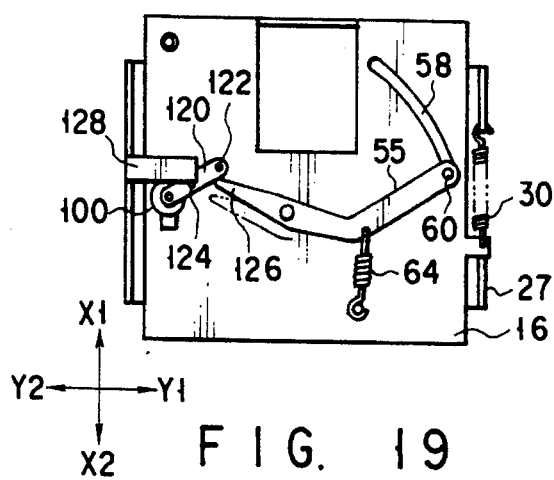
FIG. 19 is a top view indicating the relationship which the components of the shutter opening/closing mechanism used in the disk loading apparatus according to a fourth embodiment of the invention assume when a disk cartridge is not held by the holder incorporated in the apparatus.

Until an cartridge 1 is inserted into the holder 16, the distal end portion 126 of the lever 55 remain in contact with the pin 122, and the member 128 of the drive plate 27 stays in contact the pin 124 as shown in FIG. 19. When the cartridge 1 is inserted into the holder 16, the lever 55 is rotated clockwise as in the third embodiment, opening the shutter 6 and, thus, exposing part of the disk 3 through the window 5 of the cartridge 1. At this time, the distal end portion 126 of the lever 55 moves away from the pin 122 (see FIG. 20).

Figure 20:
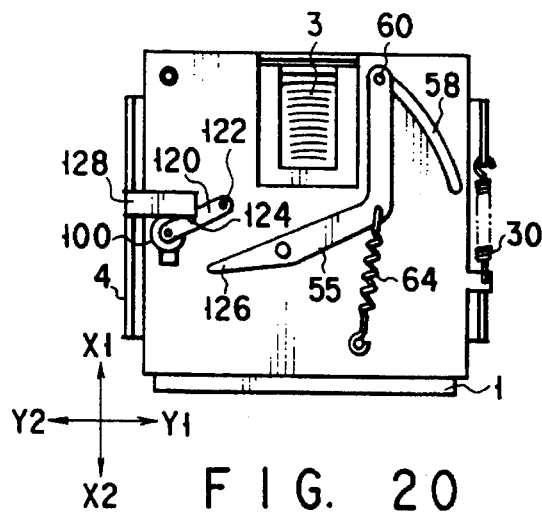
FIG. 20 is a top view showing the relationship which the components of the mechanism shown in FIG. 19 have when they hold the shutter of a disk cartridge in an open position.
Figure 21:
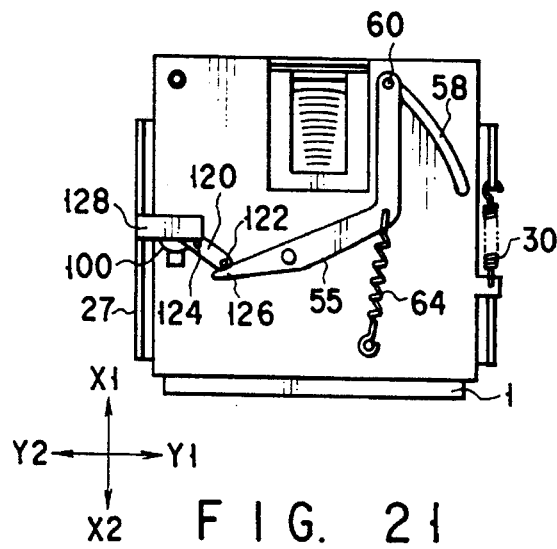
FIG. 21 is a top view illustrating the relation ship which the components of the mechanism shown in FIG. 19 assume when the drive plate used in the fourth embodiment is moved from the position shown in FIG. 20 in the direction of an arrow $X_2$.

When the cartridge 1 is completely inserted and set at the loading position as illustrated in FIG. 20, the drive plate 27 is unlocked. The plate 27 is therefore moved in the direction of the arrow $X_2$, lowering the holder 16. Then, the strip 128 of the drive plate 27, which stays in contact with the pin 124, pushes the pin 124 in the direction of the arrow $X_2$, rotating the damper arm 120 clockwise as shown in FIG. 21. Since the distal end portion 126 of the lever 55 is now out of contact with the pin 122, it does not hinder the moving of the drive plate 27. As the arm 120 rotates clockwise, it applies a damping force on the drive plate 27. Thus, the holder 16 lowers slowly. When the disk 3 is loaded on the turntable as shown in FIG. 21, the pin 122 almost contacts the distal end portion 126 of the lever 55.

Figure 22:
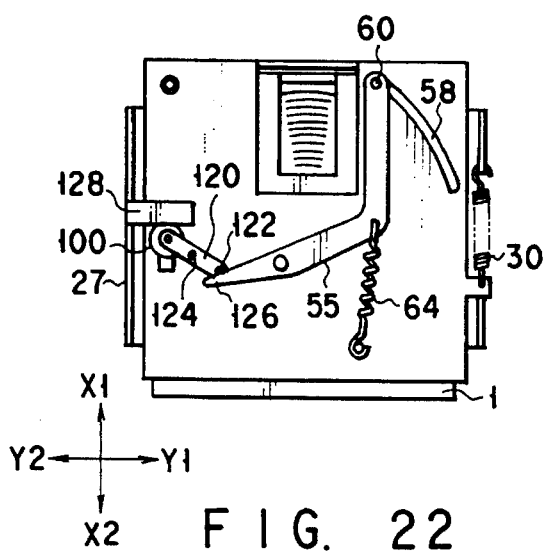
FIG. 22 is also a top view indicating the relationship which the components of the mechanism shown in FIG. 19 assume when the drive plate is moved from the position shown in FIG. 21 in the direction of an arrow $X_1$.

When the drive plate 27 is moved in the direction of the arrow $X_1$ so as to eject the cartridge 1, the holder 16 rises, whereby the member 128 leaves the pin 124 (FIG. 22). When the holder 16 reaches its highest position, the lever 55 rotates clockwise from the position shown in FIG. 22 since it biased by a shutter-closing spring 64. The lever 55 pushes the cartridge 1, ejecting it from the disk drive 11. As the lever 55 rotates clockwise, its distal end portion 126 pushes the pin 122 in the direction of the arrow $X_1$, thereby rotating the damper arm 120 counterclockwise. Since the pin 122 of the arm 120 remains in contact with the distal end portion 126 of the lever 55, the lever 120 applies a damping force on the lever 55 rotating counterclockwise. This prevents the cartridge 1 from jumping out of the disk drive.

The fourth embodiment solves the problem with the third embodiment in which an increasing force must be exerted on the cartridge 1 to insert the cartridge 1 into the holder 16 since the damper unit 100 applies a damping force on the lever 55 while the lever 55 is rotating in either direction. More specifically, in the fourth embodiment, the damping arm 120 applies a damping force on the lever 55 only while the lever 55 is rotating clockwise and ejecting the cartridge 1 from the holder 16. Namely, the cartridge 1 is ejected slowly and can be inserted lightly.

Furthermore, in the fourth embodiment the damper unit 100 applies a damping force on the drive plate 27 only while the holder 16 is being lowered. Thus, no force is unnecessarily be generated while the holder 16 is being raised.

As indicated above, in the disk loading apparatus according to the fourth embodiment of the invention, a damping force is applied on the lever 55 while the cartridge 1 is being ejected, thereby preventing the cartridge 1 form jumping out of the disk drive, and a damping force is applied on the drive plate 27 only while the holder 16 is being lowered, thereby exerting no unnecessary force on the disk, the turntable, or the spindle motor. These advantages are achieved by using only one damper, i.e., the damper unit 100. Hence, the disk loading apparatus is relatively simple in internal structure and can therefore be manufactured at a low cost.

A disk loading apparatus according to a fifth embodiment of the invention will be described, with reference to FIGS. 23 to 36.

The fifth embodiment is designed such that the lever 55 operates in interlock with a door 130 for closing the cartridge slot 12. In the following description, "housing 132" will be referred to, which comprises a front panel 11a, a bottom panel 11b, a first top cover 11d and a second top cover 11e, all identical to those shown in FIG. 5.

As shown in FIG. 23, the lever 55 is comprised of an L-shaped, shutter-opening/closing portion 134 and a substantially V-shaped operating portion 136 connected to the portion 134. A pin 60 protrudes downwards from the distal end of the portion 134. The Lever 55 has a through hole in its middle portion. A shaft 56 is loosely fitted in the hole of the lever 55. The operating portion 136 has a raised part 138 between its distal end part 136a and proximal end part 136b. The raised part 138 is connected by an inclined part 140 to the distal end part 136a.

As seen from FIGS. 23 and 24, the door 130 is hinged to the housing 132. A door spring 142, which is a torsion spring, abuts at one end on the door 130, biasing the door 130 to close the cartridge slot 12. As long as no cartridge is inserted in the slot 12, the other end of the door spring 142 remains in contact with the lower surface of the distal end part 136a of the lever 55.

A coil spring 144 is connected to the inner surface of the rear side of the housing 132 and extends horizontally. A trigger lever 146 is attached to the free end of the coil spring 144. The spring 144 and the lever 146 perform the same function as the trigger mechanism 49 which is illustrated in FIG. 6.

The operation of the fifth embodiment will be explained. First, it will be explained how the disk loading apparatus operates to set a cartridge at the loading position.

Figures 25, 26:
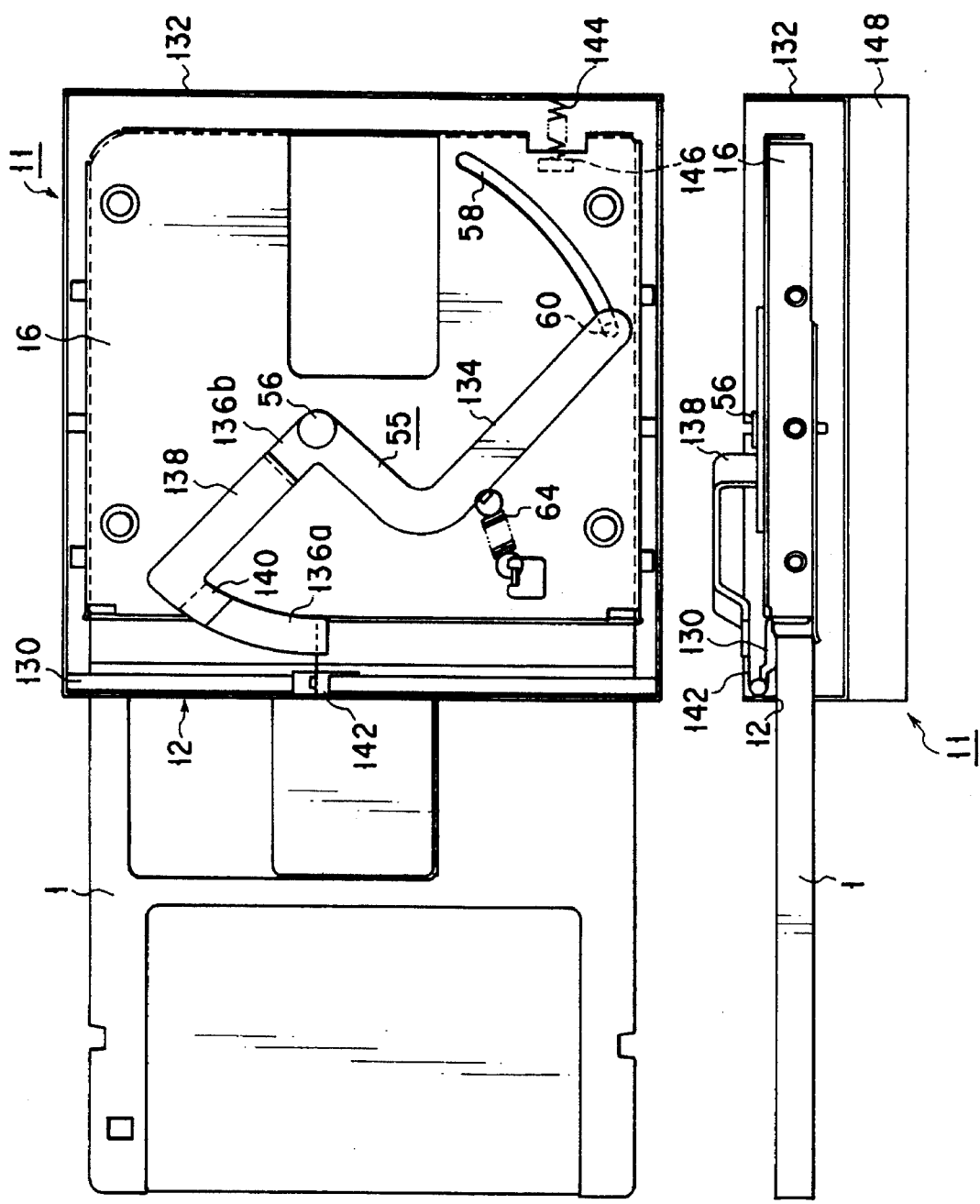
FIG. 25 is a sectional view of the apparatus shown in FIG. 23, indicating the relationship the components of the apparatus assume as a disk cartridge is inserted into the apparatus, pushing a door open.
FIG. 26 is a sectional view showing the apparatus of FIG. 23 in the condition of FIG. 25, taken along a vertical plane.
Figures 27, 28:
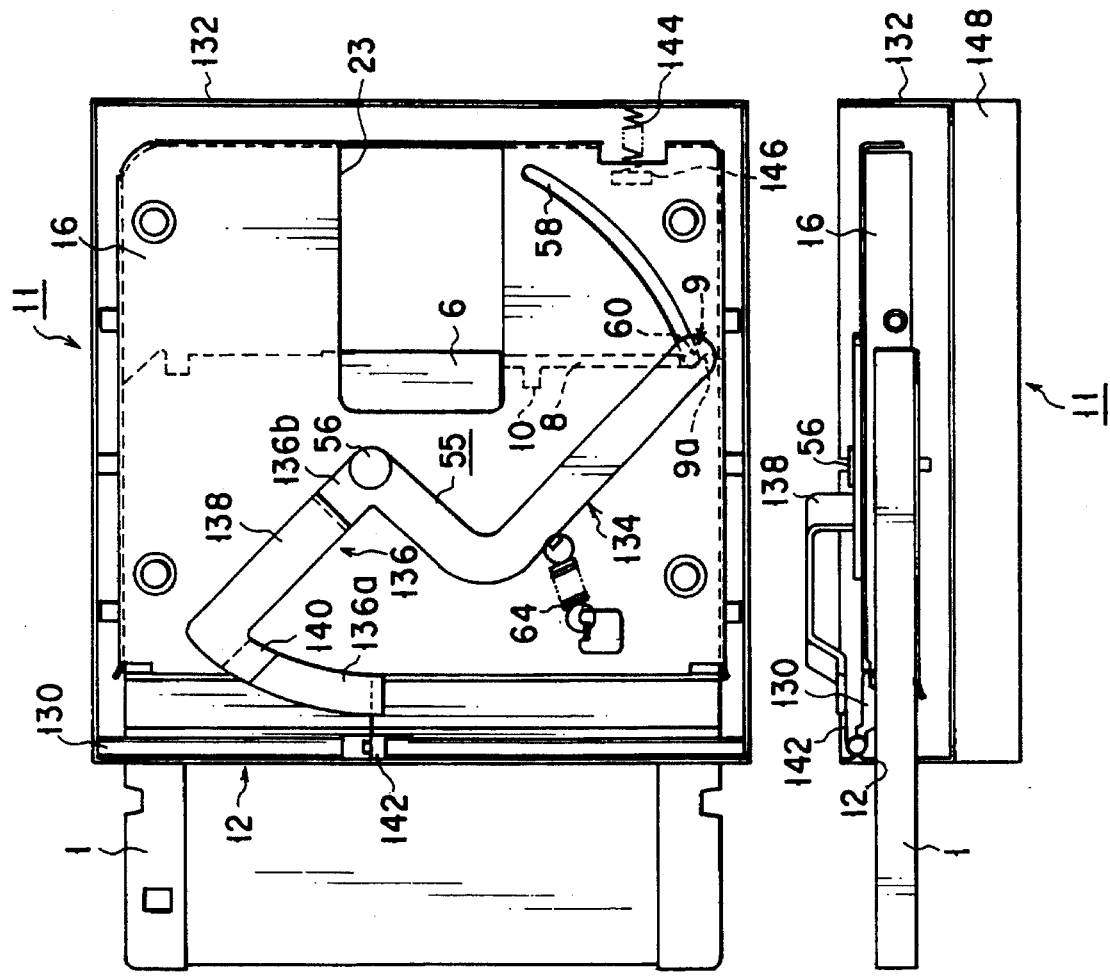
FIG. 27 is a sectional view of the apparatus shown in FIG. 23, taken along a horizontal plane, indicating a pin inserted in a shutter-opening groove of the cartridge.
FIG. 28 is a sectional view showing the apparatus of FIG. 23 in the condition of FIG. 27, taken along a vertical plane.

When a cartridge 1 is inserted into the slot 12 of the disk drive 11 as shown in FIGS. 23 and 24, it pushes the door 130 open, overcoming the bias of the door spring 142. At this time, the door 130 contacts the upper surface of the cartridge 1 as is shown in FIGS. 25 and 26 and pushes the cartridge 1 downwards by virtue of the bias of the door spring 142. As the cartridge 1 is inserted deeper into the disk drive 11 as indicated in FIGS. 27 and 28, the pin 60 of the lever 55 slips into the opening groove 9 of the cartridge 1. In this condition, the end of the door spring 142 still remains in contact with the lower surface of the distal end part 136a of the lever 55.

As the cartridge 1 is further inserted into the disk drive 11 as shown in FIGS. 29 and 30, it pushes the lever 55, rotating the same around the shaft 56 against the bias of the shutter-closing spring 64 which connected at one end to the lever 55 and at the other end to the holder 16. The pin 60 abuts on the slider 8 of the cartridge 1, pushing the shutter 6 open.

At this moment the end of the door spring 142 is approaching the inclined part 140 of the lever 55 as shown in FIG. 30.

Figures 31, 32:
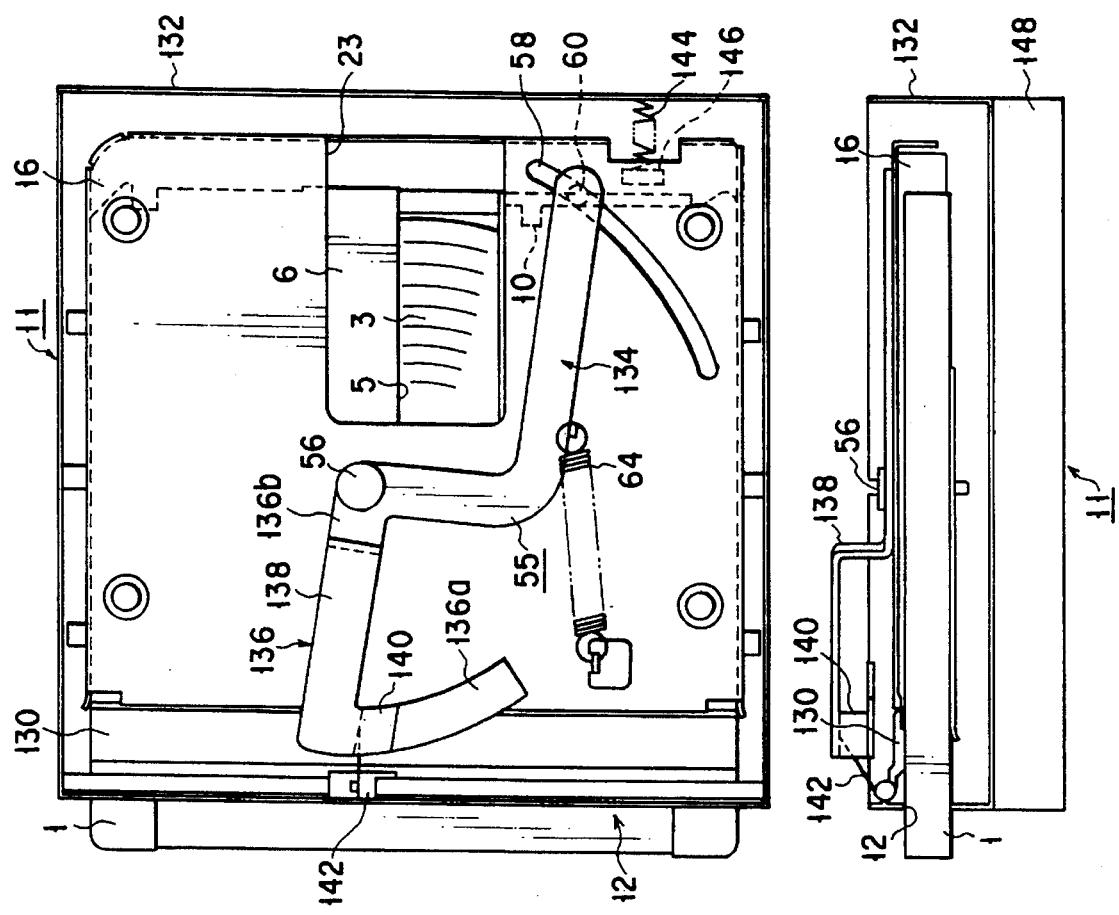
FIG. 31 is a sectional view of the apparatus shown in FIG. 23, taken along a horizontal plane, illustrating one end of the door spring sliding from the inclined surface of the operating portion to a protruding portion thereof.
FIG. 32 is a sectional view illustrating the apparatus of FIG. 23 in the condition of FIG. 31, taken along a vertical plane.

When the cartridge 1 is inserted, still deeper into the disk drive 11, the pin 60 of the shutter-opening/closing portion 134 approaches the U-notch 10 of the cartridge 1 as shown in FIGS. 31 and 32. Meanwhile, the one end portion of the door spring 142 slides on the inclined part 140 of the lever 55 as illustrated in FIG. 31 and expands as indicated in FIG. 32. As a result of this, the bias of the spring 142 decreases, and so does the force with which the door 130 pushes the cartridge 1 downwards.

Figures 33, 34:
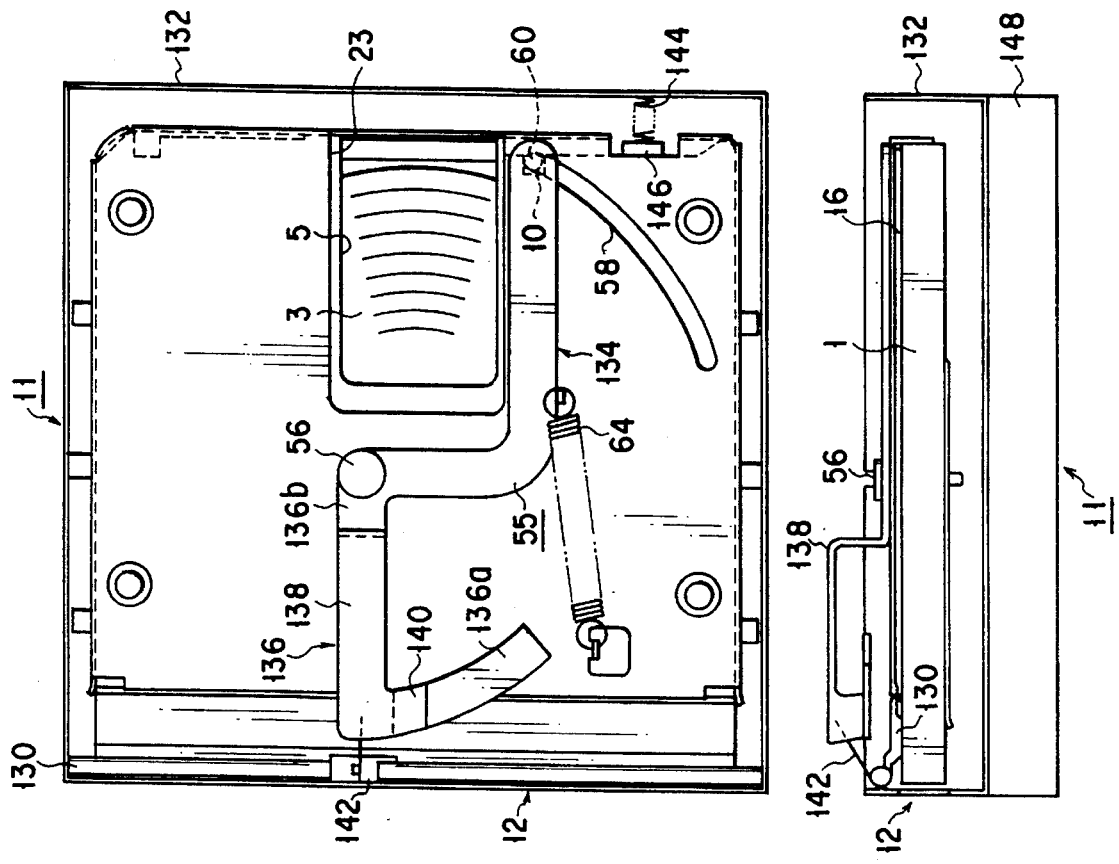
FIG. 33 is a sectional view of the apparatus shown in FIG. 23, taken along a horizontal plane, indicating the pin inserted in a shutter-opening groove of the disk cartridge.
FIG. 34 is a sectional view showing the apparatus of FIG. 23 in the condition of FIG. 33, taken along a vertical plane.

After the front edge of the cartridge abuts the trigger lever 146, the pin 60 slips into the U-notch 10 of the cartridge 1 as shown in FIG. 33, so that the window 5 is opened completely, exposing part of the disk through the rectangular opening 23 of the holder 16. The door spring 142 contacts the lower surface of the raised part 138 of the lever 55 and remains expanded as shown in FIG. 34.

Figures 35, 36:
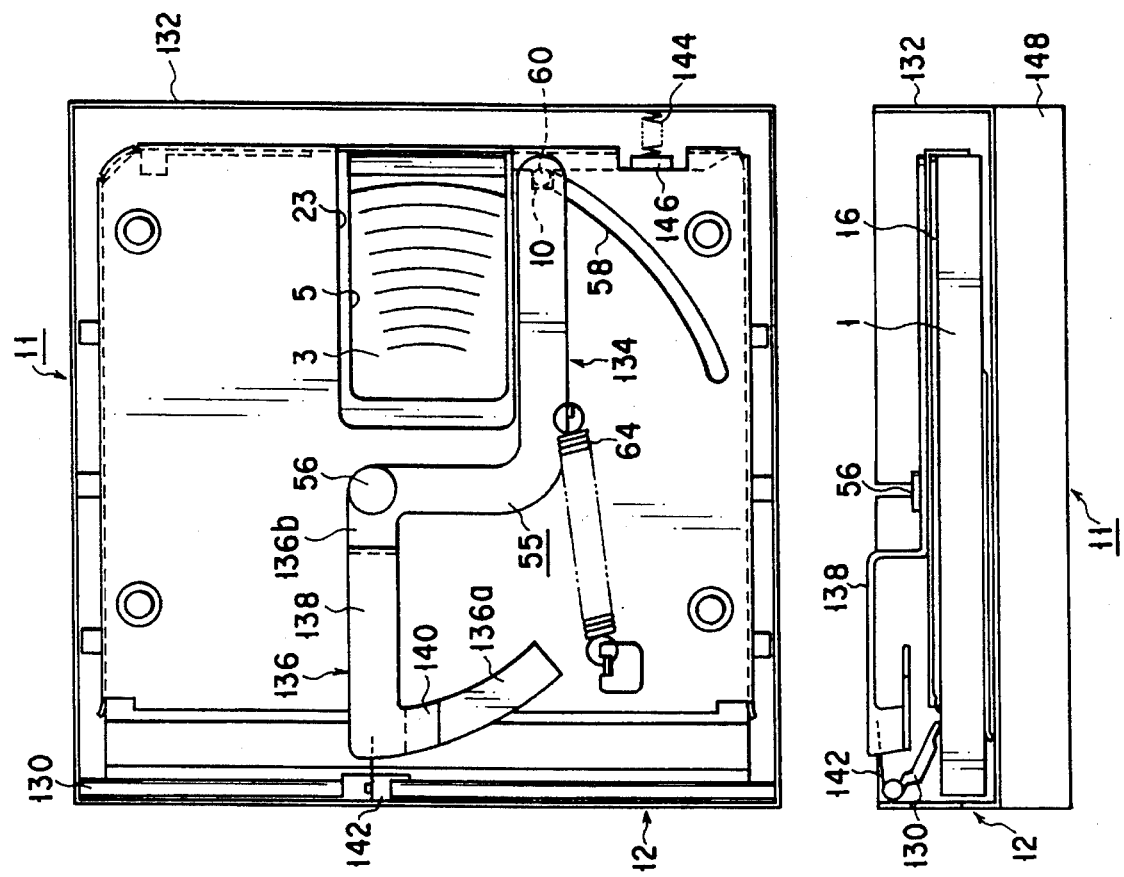
FIG. 35 is a sectional view of the apparatus shown in FIG. 23, taken along a horizontal plane, showing the holder at its lower position, holding the cartridge in the loading position.
FIG. 36 is a sectional view showing the apparatus of FIG. 23 in the condition of FIG. 35, taken along a vertical plane.
Figures 39, 40:
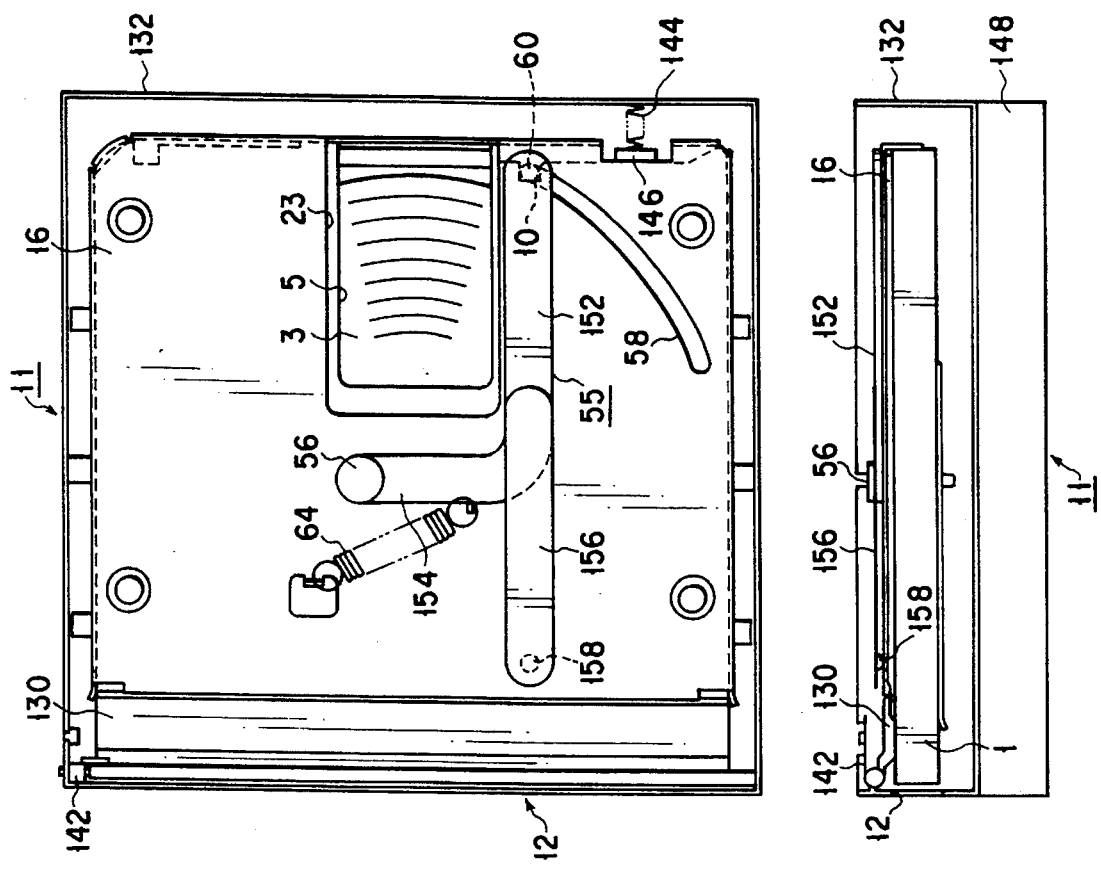
FIG. 39 is a sectional view of the apparatus shown in FIG. 37, taken along a horizontal plane, showing the holder and the cartridge both raised from the loading position.
FIG. 40 is a sectional view showing the apparatus of FIG. 37 in the condition of FIG. 39, taken along a vertical plane.

At the same time, the cartridge 1 pushes the trigger lever 146, which has been abutted with the front edge of the cartridge 1, despite the bias of the coil spring 144. The holder 16 is thereby lowered as shown in FIGS. 35 and 36 and sets the cartridge 1 at the loading position where the optical deck arranged in the housing 132 can record data on the disk 3 and reproduce data therefrom. As long as the cartridge 1 is held in the loading position, the end portions of the door spring 142 which contact the raised part 138 and the door 130, respectively, expand as much as they can, whereby the force the door 130 exerts on the cartridge 1 is minimal.

It will now be explained how the fifth embodiment operates to eject the cartridge 1 from the loading position and finally out of the disk drive 11.

To eject the cartridge 1 set in the loading position as shown in FIGS. 35 and 36, an operator pushes the eject button 14 (FIG. 5) mounted on the front panel 11a, or an eject command is supplied from a host computer (not shown) to the disk loading apparatus. Then, the drive device (32 to 34), shown in FIG. 6, drives the holder 16 upwards to the position illustrated in FIGS. 33 and 34.

As long as the holder 16 is held at this position, the door 130 extends substantially parallel to the upper surface of the cartridge 1, and the distance between the ends of the door spring 142 is shorter than when the holder 16 is at the loading position. The force the door 130 applies on the cartridge 1 increases a little. The moment the holder 16 is moved upwards to the position shown in FIGS. 33 and 34, the trigger lever 146 is unlocked, pushing the cartridge 1 in order to eject the same, by virtue of the bias of the coil spring 144.

Thereafter, when the pin 60 slips out of the U-notch 10 of the cartridge 1, the formed spring 7 shown in FIG. 2 and the shutter-closing spring 64 move the pin 60 in such a direction as to open the window 5 of the cartridge 1 as is illustrated in FIGS. 31 and 32. Simultaneously the lever 55 is rotated by the bias of the shutter-closing spring 64, whereby the pin 60 pushes the cartridge 1 to in order to eject the same. At this time, one end of the door spring 142 reaches the inclined part 140 of the lever 55. The door spring 142 is therefore bent, increasing its bias applied on the door 130. This increases the push on the cartridge 1.

When the lever 55 is rotated to the position shown in FIGS. 29 and 30, said end of the door spring 142 contacts the lower surface of the distal end part 136a of the lever 55. When the end portion of the sprig 142 contacts the lower surface of the distal end port 136a, the push on the cartridge 1 reaches its maximum. The maximum push is kept applied onto the cartridge 1 as long as the end portion of the sprig 142 remains in contact with the lower surface of the distal end port 136a —that is, up until the cartridge 1 is ejected completely from the disk drive 11.

When the pin 60 of the lever 55 slips into the shutter-opening groove 9 of the cartridge 1 and abuts on the the inclined face 9a, as is illustrated in FIGS. 27 and 28, the lever 55 is no longer rotated and the shutter 6 closes the window 5 completely. In this condition, the bias of the shutter-closing spring 64 does not acts on the cartridge 1 at all. Nonetheless, the cartridge 1 keeps moving in the direction of ejection, due to its inertia.

As has been indicated, the end portion of the door spring 142 is still in contact with the lower surface of the distal end port 136a. The downward push applied on the cartridge 1 is therefore maintained at its maximum value. Hence, the cartridge 1 readily stops by virtue of the friction between the cartridge 1 and the both of holder 16 and door 130. Even if the outer surfaces of the cartridge 1 is greased by hand-touching and has a decreased friction coefficient, the cartridge 1 can be reliably stopped before it pops out of the holder 16. This is because a brake force resulting from said friction is kept exerted on the cartridge 1 all the time the cartridge 1 is moved from the holder 16 to the ejection position shown in FIGS. 25 and 26. After the cartridge 1 has reached the ejection position, it can be pulled out of the disk drive 11 through the slot 12 as shown in FIGS. 23 and 24.

Another disk loading apparatus according to a sixth embodiment of the invention will be described, with reference to FIGS. 37 to 48.

In the sixth embodiment, the lever 55 is an L-shaped one which has no component equivalent to the operation portion 136 used in the fifth embodiment. More precisely, as shown in FIG. 37, the lever 55 has a long portion 152 and a short portion 154. The long portion 152 has a pin 60 at its distal end. The short portion 152 extends from the long portion 152 at substantially right angles thereto.

Figures 47, 48:
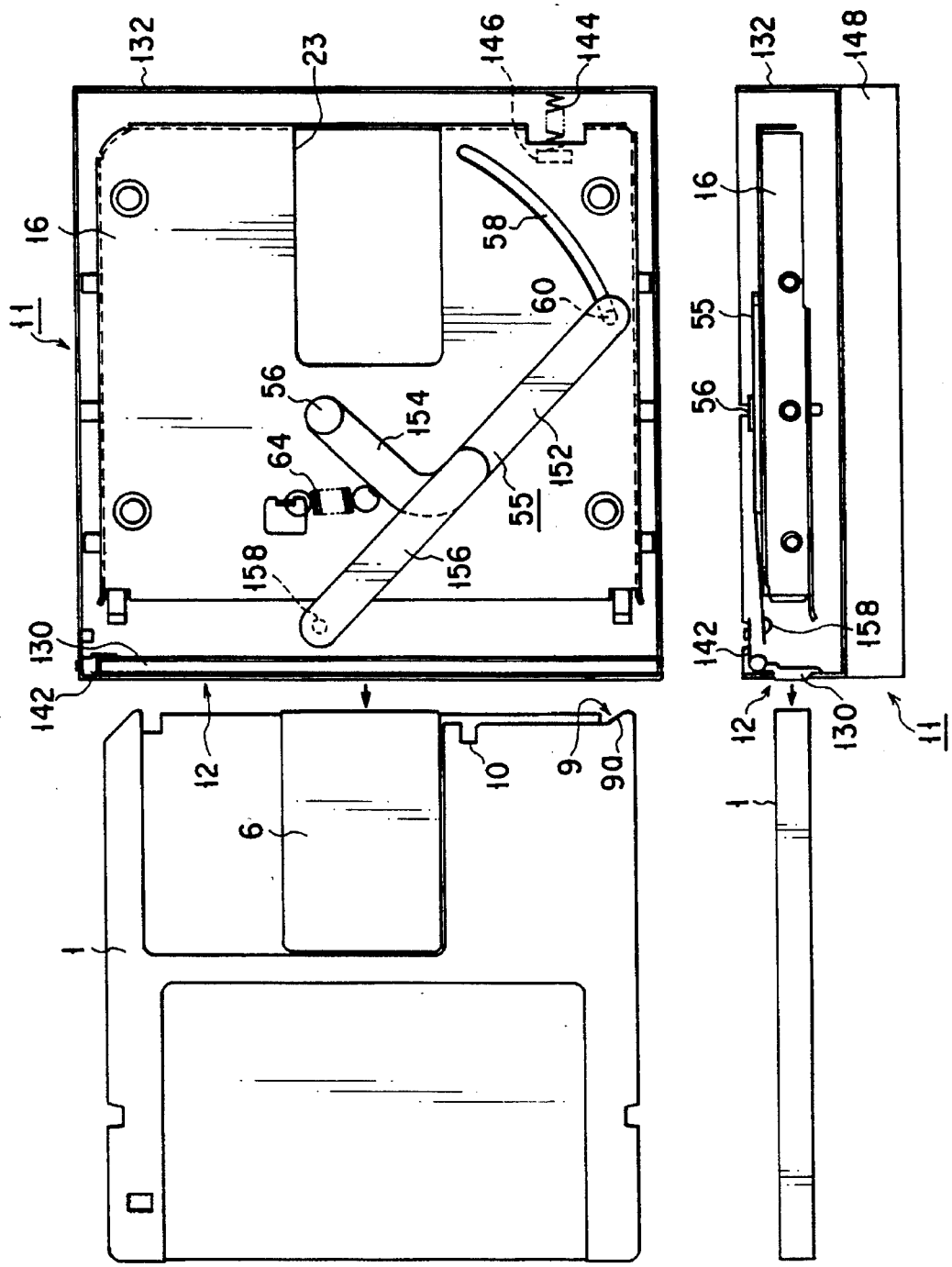
FIG. 47 is a sectional view of the apparatus shown in FIG. 37, taken along a horizontal plane, showing the disk cartridge completely pulled from the disk drive by an operator.
FIG. 48 is a sectional view showing the apparatus of FIG. 37 in the condition of FIG. 47, taken along a vertical plane.

A leaf spring 156 made, for example, phosphor bronze is connected to the proximal end of the long portion 154 of the lever 55. It extends in the axial direction of the long portion 154. A semispherical projection 158 is fixed, by spot welding or the like, to the lower surface of the distal end of the leaf spring 156. The distal end portion of the spring 156 extends toward the cartridge slot 12, for such a distance that the projection 158 can contact the door 130 when the lever 55 is rotated. As shown in FIG. 48, the leaf spring 156 is bent downwards at the middle part. Therefore, as long as no cartridge exists within the housing 132, the projection 158 is located lower than the upper wall of the holder 16, and the leaf spring 156 can apply a downward bias on the door 130.

The operation of the sixth embodiment will be explained. More precisely, only the ejection of the cartridge 1 will be explained, for the sake of simplicity of description.

To eject the cartridge 1 set in the loading position as shown in FIGS. 37 and 38, an operator pushes the eject button 14 (FIG. 5) mounted on the front panel 11a, or an eject command is supplied from a host computer (not shown) to the disk loading apparatus. Then, the drive device (32 to 34), shown in FIG. 6, drives the holder 16 upwards to the position illustrated in FIGS. 39 and 40. As long as the holder 16 is held at this position, the door 130 extends substantially parallel to the upper surface of the cartridge 1 and stays at substantially the same level as the upper wall of the holder 16. The moment the holder 16 is moved upwards to the position shown in FIGS. 39 and 40, the trigger lever 146 is unlocked, pushing the cartridge 1 in order to eject the same, by virtue of the bias of the coil spring 144.

Figures 41, 42:
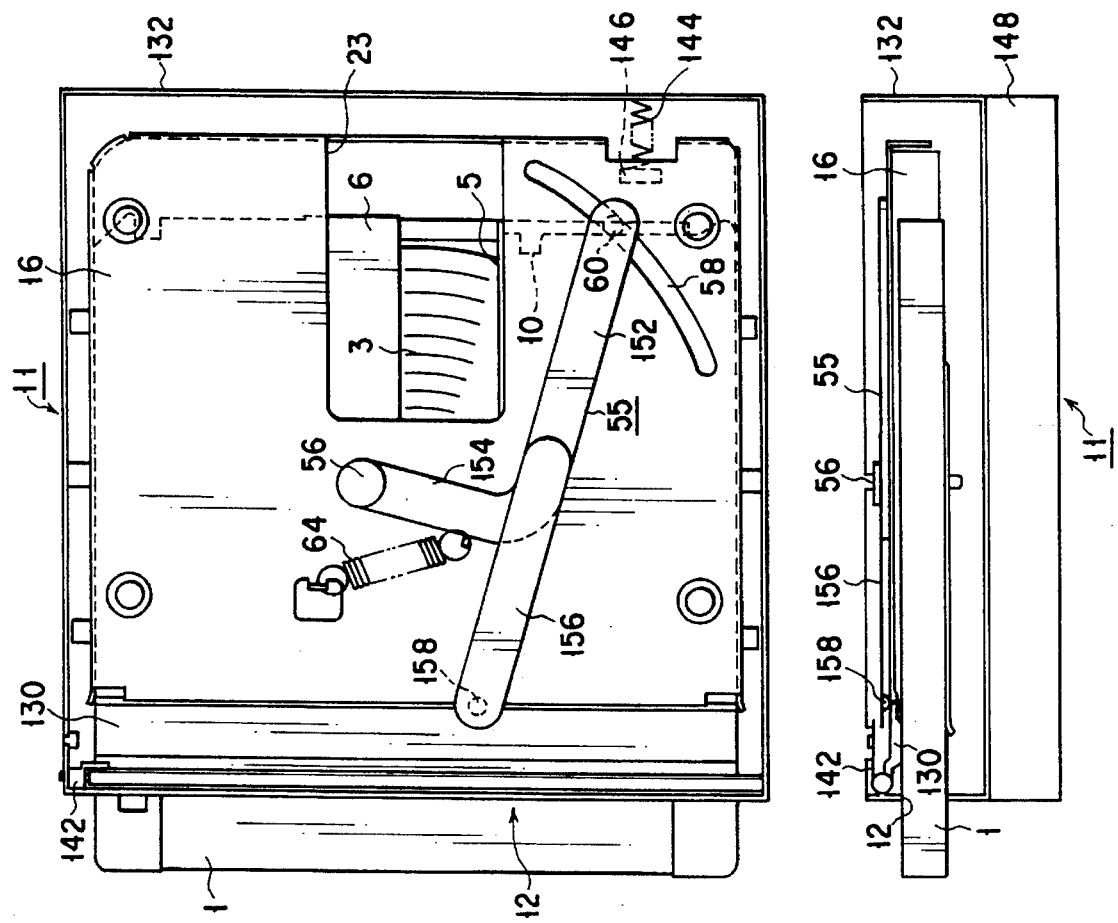
FIG. 41 is a sectional view of the apparatus shown in FIG. 37, taken along a horizontal plane, indicating the pin released from the U-noth of the disk cartridge, and also the leaf spring with its projection just having come into touch with the door.
FIG. 42 is a sectional view showing the apparatus of FIG. 37 in the condition of FIG. 41, taken along a vertical plane.

Thereafter, when the pin 60 slips out of the U-notch 10 of the cartridge 1, the formed spring 7 shown in FIG. 2 moves the pin 60 in such a direction as to open the window 5 of the cartridge 1 as is illustrated in FIGS. 41 and 42. Simultaneously, the lever 55 is rotated by the bias of the shutter-closing spring 64, whereby the pin 60 pushes the cartridge 1 so as to eject the same. At this time, the projection 158 of the leaf spring 156 goes into contact with the door 130 which exists at the same level as the upper wall of the holder 16. The leaf spring 156 starts pressing the cartridge 1 downwards. In other words, it begins to apply a brake force on the cartridge 1 being moved in the direction of ejection.

Figures 43, 44:
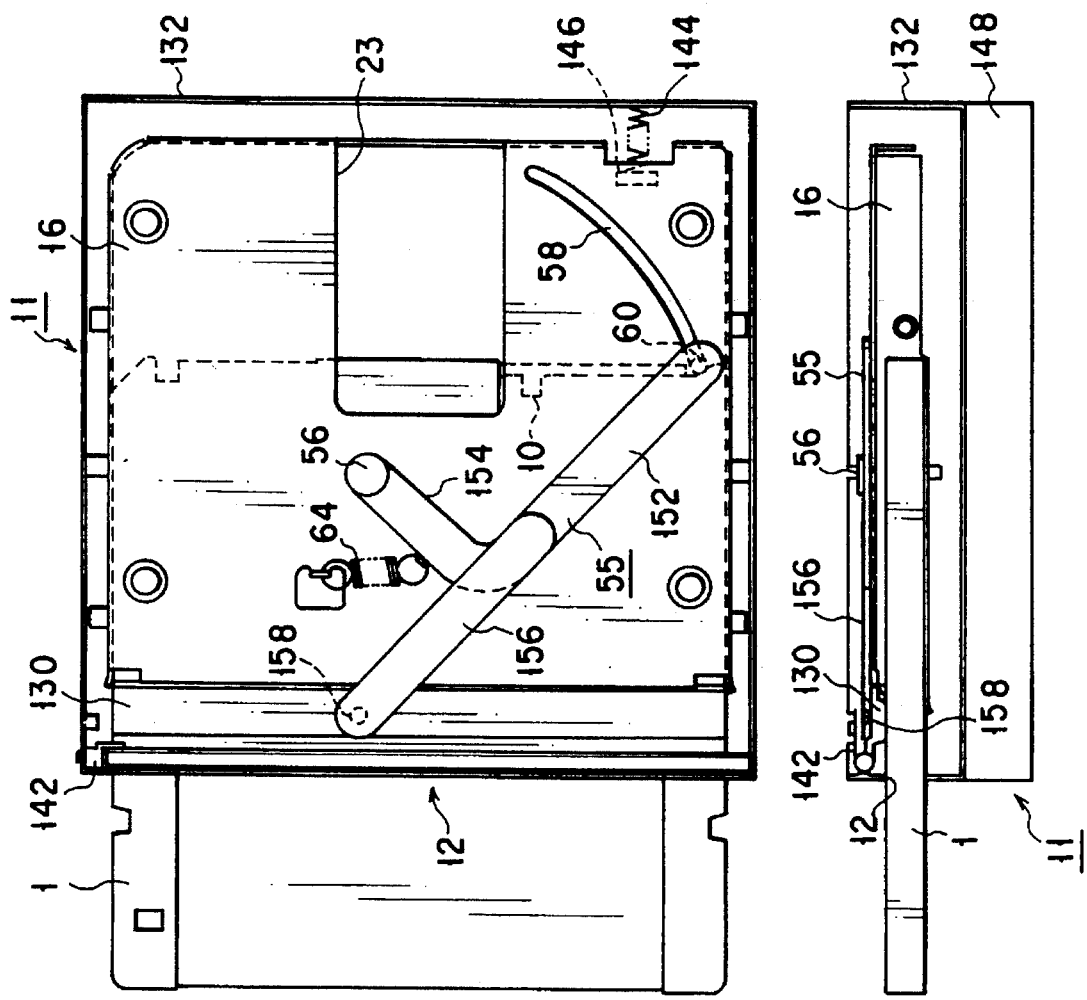
FIG. 43 is a sectional view of the apparatus shown in FIG. 37, taken along a horizontal plane, indicating the pin positioned in the shutter-opening groove of the cartridge, and also the lever having stopped rotating.
FIG. 44 is a sectional view showing the apparatus of FIG. 37 in the condition of FIG. 43, taken along a vertical plane.
Figures 45, 46:
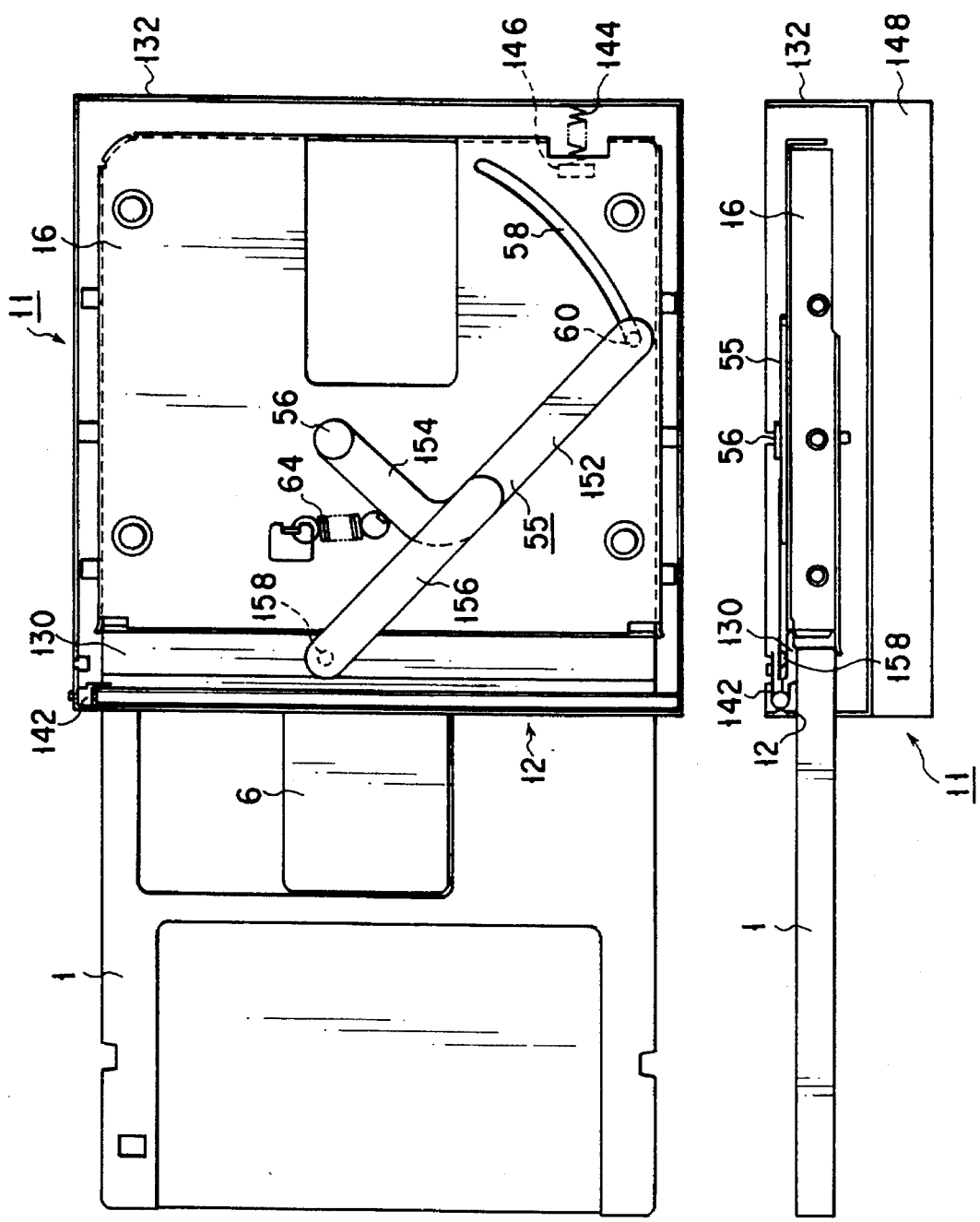
FIG. 45 is a sectional view of the apparatus shown in FIG. 37, taken along a horizontal plane, indicating the disk cartridge being pulled from the disk drive by an operator.
FIG. 46 is a sectional view showing the apparatus of FIG. 37 in the condition of FIG. 45, taken along a vertical plane.

When the pin 60 slips into the shutter-opening groove 9 of the cartridge 1 and abuts on the the inclined face 9a of the U-notch 9, as is illustrated in FIGS. 43 and 44, the lever 55 is no longer rotated and the shutter 6 closes the window 5 completely. In this condition, the bias of the shutter-closing spring 64, for ejecting the cartridge 1, does not acts on the cartridge 1 at all. Nonetheless, the cartridge 1 keeps moving in the direction of ejection, due to its inertia.

As indicated above, the projection 158 of the leaf spring 156 is still in contact with the door 130, and the door 130 therefore keeps pushing the cartridge 1 downwards. As a result, the cartridge 1 is clamped between the door 130 and the lower wall of the holder 16. Thus, the cartridge 1 is readily stopped due to the friction between the cartridge 1 and the both of holder 16 and door 130. Even if the outer surfaces of the cartridge 1 is greased by hand-touching and has a decreased friction coefficient, the cartridge 1 can be reliably stopped before it pops out of the holder 16. This is because a brake force resulting from said friction is kept exerted on the cartridge 1 all the time the cartridge 1 is moved during a long distance to the ejection position shown in FIGS. 45 and 46. After the cartridge 1 has reached the ejection position, it can be pulled out of the disk drive 11 through the slot 12 as shown in FIGS. 47 and 48.

The disk loading apparatus according to the sixth embodiment serves to more reduce the height of the disk drive than does the disk loading apparatus according to the fifth embodiment.

In the fifth and sixth embodiments, as indicated above, the bias applied on the door 130 increases as the cartridge 1 is moved in the horizontal direction. Therefore, the door 130 keeps applying a brake force on the cartridge 1 until immediately before the cartridge 1 is pulled out of the holder 16. Thus, the cartridge 1 would not fall out of the holder 16 even if the outer surfaces of the cartridge 1 is greased by hand-touching to have a decreased friction coefficient. Furthermore, since the bias applied on the door 130 to rotate the same remains minimal while the cartridge 1 is being moved in the vertical direction, the load of the eject motor used is small, saving electric power. Moreover, since the door 130 applies a great force to push it in the horizontal direction and a small force on the cartridge 1 to push it in the vertical direction, the wear of both the cartridge 1 and the door 130 can be minimized.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A disk loading apparatus for moving a disk cartridge between an ejection/insertion position and a loading position, said disk cartridge having a window and containing a data recording disk, a shutter element and shutter biasing means, the shutter element being capable of moving between a window-closing position and a window-opening position, and the shutter biasing means biasing the shutter element to the window-closing position, said apparatus comprising:

a holder for removably holding the disk cartridge, said holder being movable between the ejection/insertion position and the loading position;

a lever supported on said holder to be movable between a shutter element closing position and a shutter element opening position, and including a shutter element driving end portion and an interconnecting end portion, the shutter element driving end portion having an abutting member for abutting the shutter element of the disk cartridge when said lever is positioned in the shutter element closing position and the disk cartridge is inserted into said holder, the abutting member moving the lever from the shutter element closing position to the shutter element opening position and also moving the shutter element against the shutter biasing means generated by the shutter biasing means of the disk cartridge from the window-closing position to the window-opening position when the disk cartridge is further inserted into said holder;

a control member connected to said holder and being rotatable between a pushing position and a releasing position, said control member including a pushing end portion and a following end portion, the pushing end portion having a pushing member for pushing a side of the disk cartridge when the disk cartridge moves in said holder, said control member being positioned in the pushing position when the disk cartridge is removed from said holder and being pushed from the pushing position toward the releasing position by the side of the disk cartridge when the disk cartridge moves into said holder and abuts the pushing member of said control member;

first biasing means coupled to both the interconnecting end portion of said lever and the following end portion of said control member, and biasing said lever toward the shutter element closing position and said control member toward the releasing position; and second biasing means coupled to both said holder and the pushing end portion of said control member, and biasing said control member toward the pushing position thereof, a biasing force applied to said control member by said second biasing means being always larger than a force applied by said first biasing means but being decreased by an increase of the biasing force of said first biasing means when the disk cartridge is inserted into said holder and the abutting member moves the lever from the shutter element closing position to the shutter element opening position.

2. A disk loading apparatus according to claim 1, wherein said first biasing means includes a torsion coil spring, a center of which is coupled to said holder, both ends of which are respectively coupled to the interconnecting end portion of said lever and the following end portion of said control member.

3. A disk loading apparatus according to claim 1, wherein said lever is supported on said holder for both rotatable and linear movement, and rotates and moves linearly when said lever is moved between the shutter element closing position and the shutter element opening position.

4. A disk loading apparatus according to claim 3, wherein said first biasing means includes a torsion coil spring, a center of which is coupled to said holder, both ends of which are respectively coupled to the interconnecting end portion of said lever and the following end portion of said control member.

5. A disk loading apparatus according to claim 1, wherein said lever is rotatably supported on said holder, and rotates when said lever is moved between the shutter element closing position and the shutter element opening position.

6. A disk loading apparatus according to claim 5, wherein said first biasing means includes a tension coil spring, both ends of which are coupled to both the interconnecting end portion of said lever and the following end portion of said control member.

* * * * *